US007859203B2

(12) United States Patent
Miyashita

(10) Patent No.: US 7,859,203 B2
(45) Date of Patent: Dec. 28, 2010

(54) DELAY UNIT FOR DOOR WITH A DOOR CLOSER, DOOR CLOSER WITH A DELAY UNIT, AND DOOR WITH A DOOR CLOSER HAVING A DELAY UNIT

(75) Inventor: Sugaya Miyashita, Osaka (JP)

(73) Assignee: DT Engineering Co., Ltd., Tokyo (JP)

( * ) Notice: Subject to any disclaimer, the term of this patent is extended or adjusted under 35 U.S.C. 154(b) by 970 days.

(21) Appl. No.: 11/713,083

(22) Filed: Mar. 2, 2007

(65) Prior Publication Data

US 2007/0214725 A1 Sep. 20, 2007

(30) Foreign Application Priority Data

Mar. 13, 2006 (JP) ............................ 2006-067324
Dec. 20, 2006 (JP) ............................ 2006-342363

(51) Int. Cl.
*H02P 1/22* (2006.01)

(52) U.S. Cl. ....................... 318/266; 318/282; 318/286; 318/447; 49/324; 49/340; 49/349; 49/360

(58) Field of Classification Search ................. 318/262, 318/266, 282, 286, 443, 468, 447; 49/324, 49/340, 349, 360
See application file for complete search history.

(56) References Cited

U.S. PATENT DOCUMENTS 4,072,846 A * 2/1978 Christen et al. ............. 219/497
4,186,295 A * 1/1980 Iwao .......................... 219/497
4,263,536 A * 4/1981 Lee et al. .................... 318/266
4,289,995 A * 9/1981 Sorber et al. .................. 318/9
4,314,722 A * 2/1982 Logan, Jr. ................... 292/263
4,348,835 A * 9/1982 Jones et al. .................... 49/139
4,720,128 A * 1/1988 Logan et al. ............. 292/251.5
5,428,278 A * 6/1995 Bollengier et al. .......... 318/446
5,429,399 A * 7/1995 Geringer et al. ............... 292/92
5,479,151 A * 12/1995 Lavelle et al. ............... 340/542
5,878,530 A * 3/1999 Eccleston et al. ............. 49/139
5,913,763 A * 6/1999 Beran et al. .................... 49/506
6,891,479 B1 * 5/2005 Eccleston ................ 340/686.1
7,301,437 B2 * 11/2007 Sasaki et al. ............... 340/5.72
7,588,116 B2 * 9/2009 Kamiya ...................... 180/274
2007/0214725 A1 * 9/2007 Miyashita .................... 49/340
2007/0256362 A1 * 11/2007 Hansen .......................... 49/32
2009/0093913 A1 * 4/2009 Copeland et al. ............ 700/282
2009/0107050 A1 * 4/2009 Suzuki ........................ 49/360

* cited by examiner

*Primary Examiner*—Paul Ip
(74) *Attorney, Agent, or Firm*—Nixon & Vanderhye P.C.

(57) ABSTRACT

The Objective of the present invention is to provide a delay unit for door with a door closer, which is capable of automatically closing the door after the elapse of a certain time since the door was opened and can be installed in case that the door closer is embedded inside the building and thereby being not exposed.

The objective is solved by providing a delay unit 5 for door with a door closer comprising: a first sensor for detecting the door 2 opened to the first angle A, a lock unit 7 for electrically lock/unlock of the rotation of the rotation axis 3 of the door 2, a timer, a first sensor, and a control means, with which the first sensor, lock unit 7, and timer is connected, for controlling the lock unit 7 based on the signals from the first sensor and timer.

18 Claims, 17 Drawing Sheets

(a)

(b)

(a)

(b)

(b)

(a)

(d)

opened

DELAY UNIT FOR DOOR WITH A DOOR CLOSER, DOOR CLOSER WITH A DELAY UNIT, AND DOOR WITH A DOOR CLOSER HAVING A DELAY UNIT

This application is a U.S. patent application claiming priority on JP 2006-67324 filed Mar. 13, 2006, and JP 2006-342363 filed Dec. 20, 2006, the entire contents of each of which are hereby incorporated herein by reference.

FIELD OF THE INVENTION

The present invention relates to a delay unit for door with a door closer, door closer with a delay unit, and door with a door closer having a delay unit, which can, when the door has opened, lock the movement of the door and release the lock after the elapse of a certain time, thereby automatically closing the door.

BACKGROUND OF THE INVENTION

As a conventional door with a door closer of this type, the applicant already disclosed it in Patent applications: Japanese Patent Application No. 2005-308456 and No. 2005-356164.

In Japanese Patent Application No. 2005-308456, the door with a door closer is arranged such that by providing with a delay mechanism including such as a planetary gear unit(s), a spiral spring(s) to the door closer, the door is automatically closed after the elapse of a certain time since the door was opened.

In the mean while, in Japanese Patent Application No. 2005-356164, the door with a door closer is arranged such that by providing a delay mechanism including such as a solenoid(s), timer(s) with the door closer, the door is automatically closed after the elapse of a certain time since the door was opened.

The aforementioned Japanese Patent Application No. 2005-308456 and No. 2005-356164 both disclose a door closer, which can lock the door when the door was opened and release the door after the elapse of a certain time, thereby automatically closing the door.

In particular, Japanese Patent Application No. 2005-356164 discloses a door closer, which can be fabricated simply and cheap in addition to the aforementioned effects.

However, since the aforementioned door closers both are provided the delay mechanism with them, there may be a problem in the appearance by means of providing the delay mechanism with the door closer; in other case that the door closer is embedded inside the door, wall, or the ceiling, as well as under the floor and thereby being not exposed, there may be a difficulty in providing the delay mechanism with the door closer.

Considering the aforementioned present situation, the object of the present invention is to provide with a delay unit for door with a door closer, door closer with a delay unit, and door with a door closer having a delay unit, which can automatically close the door after the elapse of a certain time since the door with a door closer was opened and be installed in the case that the door closer is embedded inside the building, thereby being not exposed.

SUMMARY OF THE INVENTION

The aforementioned objective is achieved by the following configurations.

(1) According to the claim 1, there is provided a delay unit for door with a door closer comprising: a first sensor for detecting that the door with a door closer has been opened to the first certain angle; an electrical lock/unlock means for electrically locking/unlocking the rotation of the rotation axis of the door; a timer; a control means which is connected with the first sensor, electric electrical lock/unlock means, and timer and controls the electrical lock/unlock means on the basis of the signals from the first sensor and timer; wherein when the door has been opened to the first certain angle, the electrical lock/unlock means locks the rotation of the rotation axis of the door, and the control means controls the timer to start based on the detection signal from the first sensor; after the elapse of the first certain time, on the basis of the signal from the timer, the control means sends a control signal to the electrical lock/unlock means, thereby releasing the rotation lock of the rotation axis of the door by means of the electrical lock/unlock means.

(2) According to the claim 2, there is provided a delay unit for door with a door closer according to claim 1, comprising a second sensor for detecting the door opened to the second certain angle, wherein the second sensor is connected with the control means; when the door has opened to the second certain angle, the electric lock/unlock means locks the rotation of the rotation axis of the door; and on the basis of the detection signal of the second sensor, the control means controls the timer to work.

(3) According to the claim 3, there is provided a delay unit for door with a door closer according to claim 1, comprising a rotation angle sensor for continuously detecting the rotation angle of the door, and an arithmetic means provided with the control means, wherein when the rotation angle sensor has detected the door stopped open at an angle beyond the first certain angle less than the second certain angle, the control means controls the timer to be reset and start the measurement of the time; when the timer has finished the measurement of a total delay time defined as the excess delay time added by a delay time, the first certain time, the control means sends a control signal to the electric lock/unlock means, thereby releasing the rotation lock of the rotation axis of the door by means of the electrical lock/unlock means.

(4) According to the claim 4, there is provided a delay unit for door with a door closer according to claim 1, wherein the electric lock/unlock means is tightly fixed to the rotation axis of the door, and includes a ball capable of freely engaging in a concave portion formed on the lower surface of the lock plate, a spring for pressing the ball, a lock pin capable of freely pressing the spring, and a solenoid for moving the lock pin in and out; wherein, by means of pressing the spring and the lock pin, the rotation of the lock plate is locked by pressing the ball to contact with the concave portion; by means of the energizing the solenoid, the force pressing the lock pin is released or reduced, thereby releasing the lock of the rotation of the lock plate.

(5) According to the claim 5, there is provided a delay unit for door with a door closer according to claim 1, wherein the electric lock/releasing means is tightly fixed to the rotation axis of the door, and includes a lock plate for locking the rotation of the rotation axis, a lock member laid in the housing and capable of freely engaging in the concave formed on the lower surface of the lock plate, a front spring for pressing the lock member, a lock piston capable of freely sliding inside the housing and freely pressing the front spring, a rear spring for pressing the lock piston, a movable pin for locking the slide of the lock piston by means of moving in and out inside the housing, and a solenoid for moving the movable pin in and out; wherein when the movable pin has stuck out into the housing by means of the solenoid, the sliding movement of the lock piston is locked; and when the movable pin doesn't stick out into the housing by means of the solenoid, the lock of the sliding movement of the lock piston is released.

(6) According to the claim 6, there is provided a delay unit for door with a door closer according to claim 1, comprising an alarm/notification means connected with the control means, and a third sensor for detecting the closure of the door; wherein the control means controls the alarm/notification means to work on the basis of at least one signal from among signals form the first sensor, second sensor, third sensor, and timer.

(7) According to the claim 7, there is provided a delay unit for door with a door closer according to claim 3, wherein the control means, when the rotation angle sensor has detected the door stopped open at an angle beyond the first certain angle less than the second certain angle, controls, during the door is stopped, the alarm/notification means to work at a certain time interval or notify the time at a certain time interval by means of voice.

(8) According to the claim 8, there is provided a delay unit for door with a door closer according to claim 6, wherein the control means, in order to distinguish at least one received signal among form the received signals from the first sensor, second sensor, third sensor, and time from the other, controls the alarm/notification means to generate a different sound(s) from the other.

(9) According to the claim 9, there is provided a delay unit for door with a door closer according to claim 6, wherein the timer, when the control means has not received a signal from the first sensor or second sensor, starts the measurement of the time under the control of the control means; the control means, when having not received a signal from the third sensor until the finish of the measurement of the second certain time, controls the alarm/notification means to generate an alarm(s).

(10) According to the claim 10, there is provided a delay unit for door with a door closer comprising: a main gear being tightly fixed to the rotation axis of the door with a door closer, a outer case, to which a sub-gear meshing with the main gear is tightly fixed, a lock pin pressed, an inner case built-in inside the outer case and capable of freely rotating and tightly fixed to the building via a bracket, a lock plate provided with the inner case, a clutch laid inside the inner case, a planetary gear unit for changing the number of rotation, a spiral spring wound up by the rotation of the planetary gear unit, and a timer plate for rotating by means of the rewind of the spiral spring and releasing the lock of the lock pin after the elapse of the third certain time; wherein when the door has opened, the rotation of the rotation axis of the door is locked for a certain time, thereby delaying the start of the closing motion of the door for a certain time.

(11) According to the claim 11, there is provided a delay unit for door with a door closer according to claim 10, wherein a lock hole and convex are formed on the lock plate and on the upper surface of the timer plate, respectively, so as that, when the door is opened to the first certain angle, the lower edge of the lock pin and the convex are capable of freely engaging into the lock hole; and when the lock pin has engaged into the lock hole, the convex portion of the timer plate engages into the lock hole since the elapse of the third certain time by means of the rotation of the timer plate, and then the lock pin is pressed up, thereby releasing the lock of the door.

(12) According to the claim 12, there is provided a delay unit for door with a door closer according to claim 10, wherein a lock concave portion, to which a second lock pin engages in when the door has opened to the second certain angle, is formed on the upper surface of the lock plate.

(13) According to the claim 13, there is provided a delay unit for door with a door closer according to claim 10, comprising a first sensor for detecting the door opened to the first certain angle, a third sensor for detecting the door closed, a timer, an alarm/notification means, and a control means, with which the first sensor, third sensor, timer, and alarm/notification means are connected.

(14) According to the claim 14, there is provided a delay unit for door with a door closer according to claim 13, comprising a second sensor for detecting the door opened to the second certain angle, wherein the second sensor is connected with the control means; and the control means, when having not received a signal from the third sensor within the forth certain time measured by the timer since having had received the second sensor, controls the alarm/notification means to work.

(15) According to the claim 15, there is provided a door closer with a delay unit including an oil cylinder and piston, the door closer comprising: a mesh portion with a plurality of teeth continuously formed on the face of the piston; a lock pin having a meshing stick portion, which is formed on the tip end and capable of freely meshing with the mesh portion and the meshing stick portion is capable of freely moving in out of inside the oil cylinder; a rod for moving the lock pin in and out of the oil cylinder; a main solenoid capable of freely pressing the rod; a sub-solenoid unit capable of holding the pressed rod at the position assumed by the press; a rotation detection sensor for continuously detecting the rotation angle of the door; a timer for measuring the time; a control means, with which the main solenoid unit, sub-solenoid unit, rotation angle detector, and timer are connected, controls the main solenoid unit, sub-solenoid unit, rotation angle detector, and timer; wherein when the rotation angle sensor has detected the door stopped its rotation at an arbitrary open angle, the control means controls the timer to start the measurement; when the door starts closing at the measured time of the rest time longer than or equal to the fifth certain time less than sixth time, the main solenoid is controlled to work, thereby the main solenoid presses the rod to mesh the meshing stick portion of the lock pin with the mesh portion of the piston; in the mean while, when the rod has pressed, the sub-solenoid unit holds the rod at the position assumed by the press and maintains the piston and door in a rotation stop state; on the other hand, the control means, when having controlled the main solenoid to work, controls the timer to be reset and start the measurement of the time; when the timer has finished the measurement of the delay time, a seventh certain time, the control means controls to press to release the holding of the rod, thereby releasing the stop state of the piston and the door.

(16) According to the claim 16, there is provided a door closer with a delay unit according to claim 15, wherein the control means includes an arithmetic means; when the rotation angle sensor has detected the door opened at an arbitrary open angle, the control means controls the timer to start the measurement of the time; when the time taken for starting the closure of the door measured by the timer is longer than the sixth certain time, the arithmetic means is controlled to calculate the excess delay time defined as the excess time beyond the sixth certain time multiplied by a certain coefficient; in the mean while, the control means, when the door has started closing, controls the main solenoid unit to work and the timer to be reset and start the measurement of the time; and when the timer has finished the measurement of the total delay time defined as a delay time, the seventh certain time, added to the excess delay time, the control means controls the sub-solenoid unit to be energized.

(17) According to the claim 17, there is provided a door closer with a delay unit according to claim 15, comprising a human sensor connected with the control means; in case that the human sensor has detected a man during the measurement of a delay time, that is, the seventh certain time, or the total delay time, the control means compares the delay time, that is, the seventh certain time, or the total delay time with a human delay time, that is, a predetermined eight certain time, and then controls the timer to measure the resulting longer time as a remaining delay time; when the timer has finished the remaining delay time, the sub-solenoid is controlled to be energized; in case that the human sensor has detected a man during the closing rotation of the door, the control means controls the main solenoid unit to be energized to immediately stop the rotation of the door and the timer to start the measurement of the human delay time, that is, the eight certain time; and when the timer has finished the measurement of the eight certain time, the sub-solenoid is controlled to be energized.

(18) According to the claim 18, there is provided a door with a door closer comprising: the delay unit for door with a door closer defined in any one of claims 1 to 14, connected with the rotation axis of the door, or the door closer with a delay unit defined in any one of claims 15 to 17.

According to the present invention defined in claim 1, since there is provided a delay unit for door with a door closer comprising: a first sensor for detecting that the door with a door closer has been opened to the first certain angle; an electrical lock/unlock means for electrically locking/unlocking the rotation of the rotation axis of the door; a timer; a control means which is connected with the first sensor, electric electrical lock/unlock means, and timer and controls the electrical lock/unlock means on the basis of the signals from the first sensor and timer; wherein when the door has been opened to the first certain angle, the electrical lock/unlock means locks the rotation of the rotation axis of the door, and the control means controls the timer to start based on the detection signal from the first sensor; after the elapse of the first certain time, on the basis of the signal from the timer, the control means sends a control signal to the electrical lock/unlock means, thereby releasing the rotation lock of the rotation axis of the door by means of the electrical lock/unlock means, the door can be automatically closed by the delay unit after the elapse of the first certain time since the door was opened, and the delay unit can be fabricated compactly and economically.

According to the present invention defined in claim 2, since a delay unit for door with a door closer comprises a second sensor for detecting the door opened to the second certain angle, wherein the second sensor is connected with the control means; when the door has opened to the second certain angle, the electric lock/unlock means locks the rotation of the rotation axis of the door; and on the basis of the detection signal of the second sensor, the control means controls the timer to work, in addition to the advantage of the invention defined in claim 1, the door can be kept open, when the door has been opened to the second certain angle.

According to the present invention defined in claim 3, since a delay unit for door with a door closer comprises a rotation angle sensor for continuously detecting the rotation angle of the door, and an arithmetic means provided with the control means, wherein when the rotation angle sensor has detected the door stopped open at an angle beyond the first certain angle less than the second certain angle, the control means controls the timer to be reset and start the measurement of the time; when the timer has finished the measurement of a total delay time defined as the excess delay time added by a delay time, the first certain time, the control means sends a control signal to the electric lock/unlock means, thereby releasing the rotation lock of the rotation axis of the door by means of the electrical lock/unlock means, in addition to the advantage of the invention defined in claim 1, the delay time for starting the closing motion of the door can be extended in proportion to the time that a user holds the door open at an angle beyond the first certain angle less than the second certain angle.

According to the present invention defined in claim 4, since a delay unit for door with a door closer is arranged such that the electric lock/unlock means is tightly fixed to the rotation axis of the door, and includes a ball capable of freely engaging in a concave portion formed on the lower surface of the lock plate, a spring for pressing the ball, a lock pin capable of freely pressing the spring, and a solenoid for moving the lock pin in and out; wherein, by means of pressing the spring and the lock pin, the rotation of the lock plate is locked by pressing the ball to contact with the concave portion; by means of the energizing the solenoid, the force pressing the lock pin is released or reduced, thereby releasing the lock of the rotation of the lock plate, in addition to the advantage of the invention defined in claim 1, the electrical lock/unlock means can be fabricated compactly and economically.

According to the present invention defined in claim 5, since a delay unit for door with a door closer is arranged such that the electric lock/releasing means is tightly fixed to the rotation axis of the door, and includes a lock plate for locking the rotation of the rotation axis, a lock member laid in the housing and capable of freely engaging in the concave formed on the lower surface of the lock plate, a front spring for pressing the lock member, a lock piston capable of freely sliding inside the housing and freely pressing the front spring, a rear spring for pressing the lock piston, a movable pin for locking the slide of the lock piston by means of moving in and out inside the housing, and a solenoid for moving the movable pin in and out; wherein when the movable pin has stuck out into the housing by means of the solenoid, the sliding movement of the lock piston is locked; and when the movable pin doesn't stick out into the housing by means of the solenoid, the lock of the sliding movement of the lock piston is released, in addition to the advantage of the invention defined in claim 1, the electrical lock/unlock means can be fabricated compactly and economically and can save electric power.

According to the present invention defined in claim 6, since a delay unit for door with a door closer comprises an alarm/notification means connected with the control means, and a third sensor for detecting the closure of the door; wherein the control means controls the alarm/notification means to work on the basis of at least one signal from among signals form the first sensor, second sensor, third sensor, and timer, in addition to the advantage of the invention defined in claim 1, there is an advantage that it is possible to notify the generation of the signal from the first sensor, second sensor, third sensor, or timer by means of the alarm/notification means.

According to the present invention defined in claim 7, since a delay unit for door with a door closer is arranged such that the control means, when the rotation angle sensor has detected the door stopped open at an angle beyond the first certain angle less than the second certain angle, controls, during the door is stopped, the alarm/notification means to work at a certain time interval or notify the time at a certain time interval by means of voice, in addition to the advantage of the invention defined in claim 3, it is possible to notify the rest time of the door to a man/woman handling the door, thereby he/she can easily set the excess delay time of the door.

According to the present invention defined in claim 8, since a delay unit for door with a door closer is arranged such that the control means, in order to distinguish at least one received signal among form the received signals from the first sensor, second sensor, third sensor, and time from the other, controls the alarm/notification means to generate a different sound(s) from the other, in addition to the advantage of the invention defined in claim 6, the alarm/notification means can generate a different sound(s), thereby allowing to distinguish the sound from the other.

According to the present invention defined in claim 9, since a delay unit for door with a door closer is arranged such that the timer, when the control means has not received a signal from the first sensor or second sensor, starts the measurement of the time under the control of the control means; the control means, when having not received a signal from the third sensor until the finish of the measurement of the second certain time, controls the alarm/notification means to generate an alarm(s), in addition to the advantage of the invention defined in claim 6, it is possible to alarm, when the door is open for the time longer than or equal to a certain time.

According to the present invention defined in claim 10, since there is provided a delay unit for door with a door closer comprises a main gear being tightly fixed to the rotation axis of the door with a door closer, a outer case, to which a sub-gear meshing with the main gear is tightly fixed, a lock pin pressed, an inner case built-in inside the outer case and capable of freely rotating and tightly fixed to the building via a bracket, a lock plate provided with the inner case, a clutch laid inside the inner case, a planetary gear unit for changing the number of rotation, a spiral spring wound up by the rotation of the planetary gear unit, and a timer plate for rotating by means of the rewind of the spiral spring and releasing the lock of the lock pin after the elapse of the third certain time; wherein when the door has opened, the rotation of the rotation axis of the door is locked for a certain time, thereby delaying the start of the closing motion of the door for a certain time, it is possible to automatically close the door after the third certain time since the door was opened; and since the delay unit is not provided with the door closer, it is possible to be installed in case that the door closer is embedded inside the door, wall, or ceiling, as well as under the floor surface. Further, since the aforementioned delay unit mechanically comprises, wiring works and the like are unnecessary.

According to the present invention defined in claim 11, since a delay unit for door with a door closer is arranged such that a lock hole and convex are formed on the lock plate and on the upper surface of the timer plate, respectively, so as that, when the door is opened to the first certain angle, the lower edge of the lock pin and the convex are capable of freely engaging into the lock hole; and when the lock pin has engaged into the lock hole, the convex portion of the timer plate engages into the lock hole since the elapse of the third certain time by means of the rotation of the timer plate, and then the lock pin is pressed up, thereby releasing the lock of the door, in addition to the advantage of the invention defined in claim 10, it is possible to unlock the lock of the door after the elapse of the third certain time.

According to the present invention defined in claim 12, since a delay unit for door with a door closer is arranged such that a lock concave portion, to which a second lock pin engages in when the door has opened to the second certain angle, is formed on the upper surface of the lock plate, in addition to the advantage of the invention defined in claim 10, it is possible to lock the door at the second certain angle.

According to the present invention defined in claim 13, since a delay unit for door with a door closer comprises a first sensor for detecting the door opened to the first certain angle, a third sensor for detecting the door closed, a timer, an alarm/notification means, and a control means, with which the first sensor, third sensor, timer, and alarm/notification means are connected, in addition to the advantage of the invention defined in claim 10, it is possible to alarm in case that the door is not closed within the fourth certain time since the door was opened to the first certain angle.

According to the present invention defined in claim 14, since a delay unit for door with a door closer comprises a second sensor for detecting the door opened to the second certain angle, wherein the second sensor is connected with the control means; and the control means, when having not received a signal from the third sensor within the forth certain time measured by the timer since having had received the second sensor, controls the alarm/notification means to work, in addition to the advantage of the invention defined in claim 13, it is possible to alarm in case that the door is not closed within the fourth certain time since the door was opened to the second certain angle.

According to the present invention defined in claim 15, since there is provided a door closer with a delay unit including an oil cylinder and piston, the door closer comprises: a mesh portion with a plurality of teeth continuously formed on the face of the piston; a lock pin having a meshing stick portion, which is formed on the tip end and capable of freely meshing with the mesh portion and the meshing stick portion is capable of freely moving in out of inside the oil cylinder; a rod for moving the lock pin in and out of the oil cylinder; a main solenoid capable of freely pressing the rod; a sub-solenoid unit capable of holding the pressed rod at the position assumed by the press; a rotation detection sensor for continuously detecting the rotation angle of the door; a timer for measuring the time; a control means, with which the main solenoid unit, sub-solenoid unit, rotation angle detector, and timer are connected, controls the main solenoid unit, sub-solenoid unit, rotation angle detector, and timer; wherein when the rotation angle sensor has detected the door stopped its rotation at an arbitrary open angle, the control means controls the timer to start the measurement; when the door starts closing at the measured time of the rest time longer than or equal to the fifth certain time less than sixth time, the main solenoid is controlled to work, thereby the main solenoid presses the rod to mesh the meshing stick portion of the lock pin with the mesh portion of the piston; in the mean while, when the rod has pressed, the sub-solenoid unit holds the rod at the position assumed by the press and maintains the piston and door in a rotation stop state; on the other hand, the control means, when having controlled the main solenoid to work, controls the timer to be reset and start the measurement of the time; when the timer has finished the measurement of the delay time, a seventh certain time, the control means controls to press to release the holding of the rod, thereby releasing the stop state of the piston and the door, the door can be locked at an arbitrary angle for the seventh certain time, when the door was opened and held its rotation for the time longer than or equal to the fifth certain time; and the door closer with a delay unit is fabricated compactly and economically.

According to the present invention defined in claim 16, since a door closer with a delay unit is arranged such that the control means includes an arithmetic means; when the rotation angle sensor has detected the door opened at an arbitrary open angle, the control means controls the timer to start the measurement of the time; when the time taken for starting the closure of the door measured by the timer is longer than the sixth certain time, the arithmetic means is controlled to calculate the excess delay time defined as the excess time beyond the sixth certain time multiplied by a certain coefficient; in the mean while, the control means, when the door has started closing, controls the main solenoid unit to work and the timer to be reset and start the measurement of the time; and when the timer has finished the measurement of the total delay time defined as a delay time, the seventh certain time, added to the excess delay time, the control means controls the sub-solenoid unit to be energized, in addition to the advantage of the invention defined in claim 15, a man/woman handling the door can easily set, by means of opening the door to an arbitrary angle and holding it, the excess delay time for starting the closing motion of the door in proportion to the holding time.

human sensor has detected a man during the measurement of a delay time, that is, the seventh certain time, or the total delay time, the control means compares the delay time, that is, the seventh certain time, or the total delay time with a human delay time, that is, a predetermined eight certain time, and then controls the timer to measure the resulting longer time as a remaining delay time; when the timer has finished the remaining delay time, the sub-solenoid is controlled to be energized; in case that the human sensor has detected a man during the closing rotation of the door, the control means controls the main solenoid unit to be energized to immediately stop the rotation of the door and the timer to start the measurement of the human delay time, that is, the eight certain time; and when the timer has finished the measurement of the eight certain time, the sub-solenoid is controlled to be energized, in addition to the advantage of the invention defined in claim 15, it is possible to secure the safety of the man/woman, when he/she is at the door, by detecting him/her and delaying the closing motion of the door; and in case that a man/woman is detected during the closing motion of the door, the closing motion of the door can be stopped, and, further, automatically be restarted after the elapse of a certain time.

According to the present invention defined in claim 18, since there is provided a door with a door closer comprising: the delay unit for door with a door closer defined in any one of claims 1 to 14, connected with the rotation axis of the door, or the door closer with a delay unit defined in any one of claims 15 to 17, there can be provided a door with door closer having an advantage(s) of the invention defined in any one of the claims 1 to 17.

BRIEF DESCRIPTION OF THE DRAWINGS

FIG. 7 (*a*) shows the state of the movable pin of the lock unit being drawn in, and FIG. 7 (*b*) shows that the movable pin is stuck out;

DETAILED DESCRIPTION OF THE PREFERRED EMBODIMENTS

Figure 1:
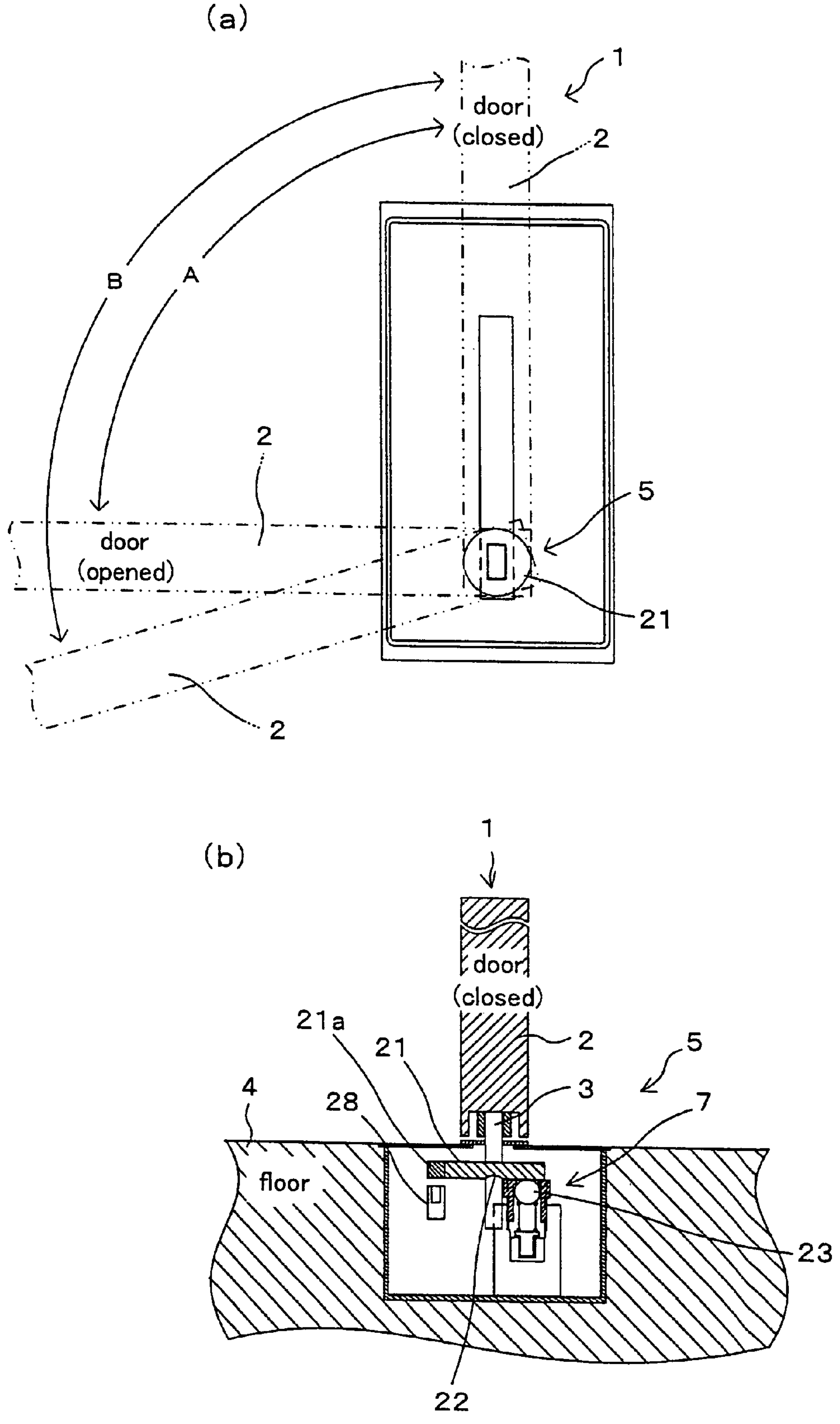
FIG. 1 (*a*) is a top view of a door with a door closer according to the first embodiment and FIG. 1 (*b*) is a frontal view of the longitudinal cross-section of the same.

Hereinafter, referring to the drawings illustrating embodiments, the embodiments of the present invention will be described.

Figure 2:
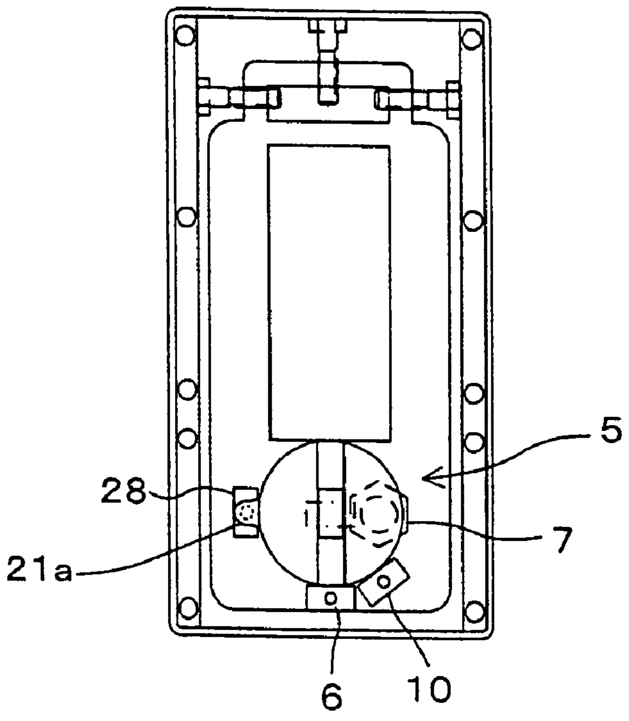
FIG. 2 (*a*) is a top view illustrating the arrangement of the installed delay unit shown in FIG. 1 and FIG. 2 (*b*) is a top view of a lock plate shown in FIG. 1.
Figure 2:
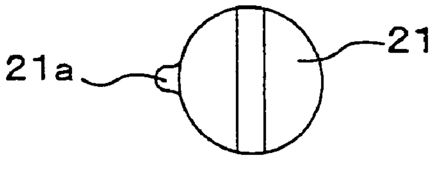

In FIGS. 1 and 2, the symbol 1 denotes a door with a door closer according to the first embodiment of the present invention. The door with a door closer 1 comprises a door closer (not shown) for pressing the door 2 toward the closing direction, wherein a delay unit 5, which has a function for locking the rotational motion of the door 2 for a certain time (hereinafter, referred to as "first certain time") and unlocking thereafter, is installed, connected with the rotation axis 3, around the lower part of the rotation axis 3 of the door 2 under the floor surface 4. Hereat, the place, where the delay unit 5 is installed, should not be construed as limited under the floor surface 4, but it can be inside the wall or ceiling of the building.

Figure 3:
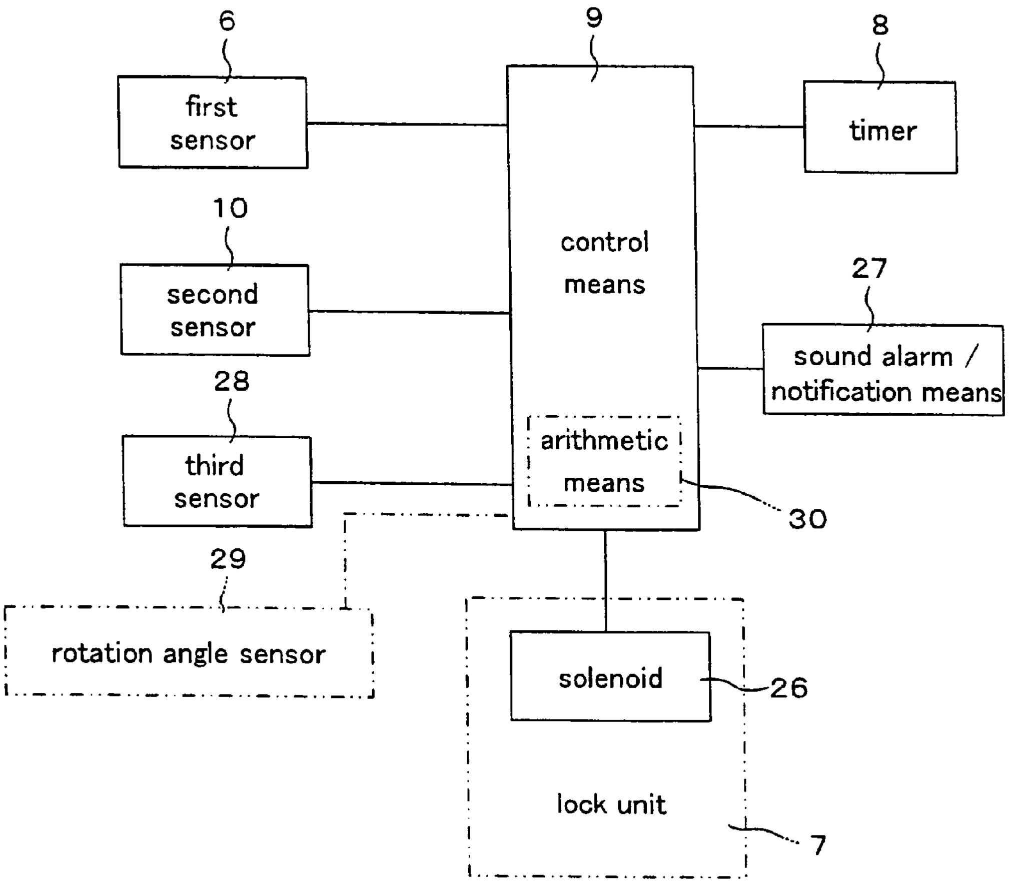
FIG. 3 is a schematic view of the electronic circuit of the door with a door closer shown in FIG. 1.

The delay unit 5 includes a first sensor 6 for detecting the door 2 having been opened to the first certain angle A (for example, 90 deg.) shown in FIG. 1(*a*), a lock unit 7 as electrical lock/unlock means for electronically locking and unlocking of the rotational motion of the door 2, a timer 8 shown in FIG. 3, and a control means 9 consisting of a control circuit having a central processing unit, which is electrically connected with the first sensor 6, lock unit 7, and timer 8, and controls the lock unit 7 on the basis of signals from the first sensor 6 and timer 8.

Further, the delayed unit 5 has a second sensor 10 for detecting the door 2 opened to the second certain angle B (for example, 110 deg.), wherein the second sensor 10 is electrically connected with the control means 9.

Figure 4:
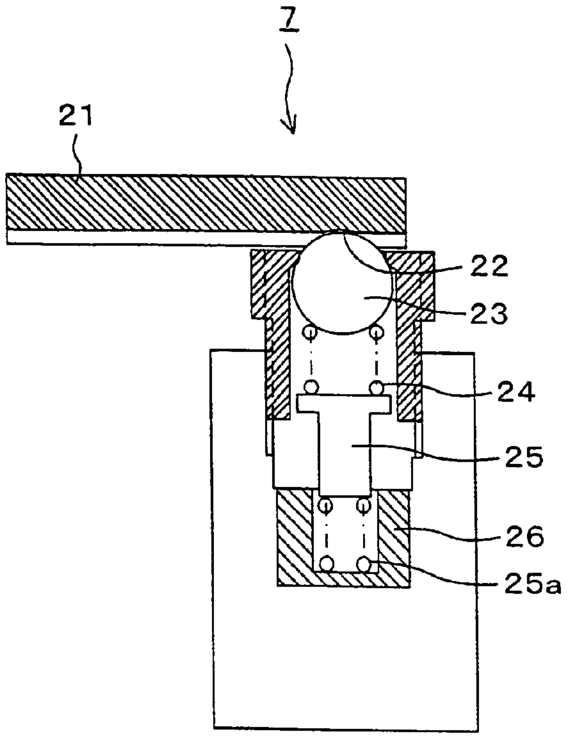
FIG. 4 is a frontal view of the longitudinal cross-section of the lock unit shown in FIG. 1.

The lock unit 7 includes: a lock plate 21, which has a disk-like shape, is tightly fixed to the lower edge portion of the rotation axis 3 of the door 2, and is provided for locking the rotational motion of the rotation axis 3; a ball 23 capable of freely engaging in a concave portions 22, which is formed, as shown in FIG. 4, on the lower surface of the lock plate 21; a spring 24 for pressing the ball 23; a lock pin 25 pressed by a spring 25*a* and capable of freely pressing the spring 24; a solenoid 26 for moving the lock pin 25 in and out; and wherein the rotational motion of the lock plate 21 is locked by the ball 23, which is pressed to contact with the concave portion 22 by means of the press of the spring 24 and lock pin 25, and then the press of the lock pin 25 is released or reduced by energizing the solenoid 26, thereby the lock of rotational motion of the lock plate 21 is unlocked.

In addition, on a part of the radially outer portion of the lock plate 21, a convex portion 21*a* is provided to stick out, as shown in FIG. 2, and is a target being detected by the first sensor 6 and second sensor 10.

Hereat, the concave portions 22 are formed on positions, one is formed on the place, to which a ball 23 is capable of engaging, when the door 2 has opened to the first certain angle A (hereinafter, referred to as "position for first certain angle") and another one is formed on the place, to which a ball 23 is capable of engaging, when the door 2 has opened to the second certain angle B (hereinafter, referred to as "position for second certain angle").

Moreover, the delay unit 5 includes: a sound alarm/notification means 27 consisting of a buzzer and/or alarm unit to be electrically connected with the control means 9; and a third sensor 28 for detecting the closure of the door 2; wherein the control means 9 controls the sound alarm/notification means 27 to work on the basis of at least one signal from among the signals output from the first sensor 6, second sensor 10, third sensor 28, and timer 8. Here, alternatively or in addition to the sound alarm/notification means 27, other alarm/notification means, which uses such as light, telephone, electronic mail (hereinafter, simply referred to as "e-mail"), etc, is available.

The first sensor 6, second sensor 10, and third sensor 28 are aligned at adequate positions within an area, over which the concave passes by the rotation, or the vicinity thereof; in detail, the first sensor 6 is aligned at a position, where it detects the convex portion 21*a* when the door 2 is rotated to the first certain angle A (90 deg.); the second sensor 10 is aligned at a position where it detects the convex portion 21*a* when the door 2 is rotated to the second certain angle B (110 deg.); and the third sensor 28 is aligned at a position where it detects the convex portion 21*a* when the door 2 is closed.

In order to distinguish at least one received signal from among received signals from the first sensor 6, second sensor 10, third sensor 28, and timer 8, the control means 9 can be arranged to control the sound alarm/notification means 27 to generate a sound different from each other.

Further, the timer 8, when the control means 9 has received a signal from the first sensor 6 or second sensor 10, starts the measurement of a relatively long time ("second certain time" to be described below) under the control of the control means 9; and the control means 9, when having received no signal from the third sensor 28 until the finish of the measurement by the timer 8, controls the sound alarm/notification means 27 to generate an alarm.

With these arrangements, when the door 2 of the door with a door closer 1 has opened to the first certain angle A (90 deg.) shown in FIG. 1, the rotation axis 3 rotates together with the door 2, and the lock plate 21 tightly fixed to the rotation axis 3 also rotates. When the door 2 has been opened to the first certain angle A, the upper edge portion of the ball 23 is pressed by the spring 24 and lock pin 25 to engage into the concave portion 22 of the lock plate 21.

Thereby, the ball 23 becomes hard to remove from the concave portion 22, and locks the rotational motion of the lock plate 21. That is, the door 2 is locked, opened to the first certain angle (90 deg.).

In the meanwhile, the convex portion 21*a* provided on the lock plate 21 is detected by the first sensor 6, and then the signal indicating the detection (hereinafter, referred to as "detection signal") is output from the first sensor 6 to the control means 9. When receiving the signal from the first sensor 6, the control means 9 controls the timer 8 to start the measurement; and when the timer 8 has finished the measurement of the predetermined first certain time, the control means 9 energizes the solenoid 26 on the basis of the signal, which indicates the finish of the measurement of the first certain time, from the timer 8.

When the solenoid 26 has been energized, the pressing force of the lock pin 25 is released or reduced, thereby releasing the lock of the rotational motion of the lock plate 21. That is, the force that the ball 23 is pressed to contact with the concave portion 22 is weakened; the ball becomes easy to remove out; a force occurs toward a closing direction of the door 2 by means of the force of the door closer, the weight of the door 2, and the like; the ball 23 is removed from concave portion 22 by these force; and then the door 2 rotates toward the closing direction.

When the door has been closed, the third sensor 28 detects the convex portion 21*a* and sends the detection signal to the control means 9.

Further, the timer 8 continues the measurement after having finished the measurement of the first certain time; and when finishing the predetermined second certain time, which is longer than the first certain time, the timer 8 sends the signal indicating the finish of the measurement of the second certain time to the control means 9. The control means 9, when having not received the signal from the third sensor 28 until the reception of this detection signal, sends a control signal for controlling the sound alarm/notification means 27 to ring an alarm.

Thereby, it is possible to warn a trouble that the door 2 continues not to be closed after it was opened.

Hereat, regarding the aforementioned delay unit, in case that there is a transmission of a signal from the first sensor 6, second sensor 10, third sensor 28, or timer 8, the control means 9 can be arranged to control the sound alarm/notification means 27 to generate an appropriate notification sound(s).

Further, in order to distinguish the received signal(s) from among received signals from the first sensor 6, second sensor 10, third sensor 28, and/or timer 8, the sound alarm/notification means 27 can be controlled to generate a different sound(s).

Therefore, since the delay unit 5, which locks the rotational motion of the rotation axis 3 of the door 2 for a certain time interval and then releases, is installed under the floor surface 4 near the lower edge portion of the rotation axis 3, the door with a door closer 1 can automatically close the door 2 by means of delay unit 5 after the elapse of the first certain time since the door 2 was opened; since the delay unit 5 isn't installed directly to the door closer, the door with a door closer 1 can be installed in such case that a door closer is embedded inside the door 2 or wall, or under the floor surface 4 thereby being not exposed.

Further, since the door 2 can be automatically closed after the elapse of the first certain time since it was opened, the door with a door closer 1 is also very convenient for such as carrying packages in and out, and moreover, improve the safety of a handicapped person, aged person, wheelchair, and the like passing there.

Yet further, by means of automatically closing the door 2 after the elapse of the first certain time, it is possible to reduce the loss of the air conditioning for cooling, warming, etc., thereby contributing to save the cost necessary to the air conditioning and also to avoid the global warming.

Still further, since the configuration of the delay unit 5 and the lock unit 7 are compact, a compact and economical fabrication is possible.

Yet still further, it is also possible to ring an alarm, when the door 2 continues to be opened for the time longer than or equal to a certain time (hereinafter, referred to as "second certain time").

Next, explanations are described on the action that the door 2 of the door with a door closer 1 is opened to the second certain angle B (110 deg.) shown in FIG. 1.

In the case of opening the door 2 to the second certain angle B, the ball 23, when the door has opened to the first certain angle A (90 deg.), is pressed by the spring 24 and lock pin 25, and thereby the upper edge portion of the ball 23 engages, at the first certain angle A, into the concave portion 22 formed on the lock plate 21. In the meanwhile, the convex portion 21*a* formed on the radially outer portion of the lock plate 21 is detected by the first sensor 6, the detection signal is sent to the control means 9, and thereby the control means 9 controls the timer 8 to work.

However, the ball 23 of the door 2 is removed from the concave portion 22 by the force opening the door 2 toward the second certain angle B, and door 2 rotates to the opening direction until rotating to the second certain angle B.

Then, when the door 2 has opened to the second certain angle B, the ball 23 is pressed by the spring 24, and thereby the upper edge portion of the ball 23 engages into the concave portion 22 for the second certain angle B, formed on the lock plate 21. Then, by means of the press of the lock pin 25 and spring 24, the ball 23 is strongly pressed to contact into the concave portion 22. Thereby, the ball 23 becomes hard to remove from the concave portion 22 and locks the rotational motion of the lock plate 21. Accordingly, the door 2 is kept opened at the second certain angle B.

In the meanwhile, the convex portion 21*a* formed on the radially outer portion of the lock plate 21 is detected by the second sensor 10, and the detection signal is sent from the second sensor 10 to the control means 9.

The control means 9, when receiving the signal from the second sensor 10, controls the timer 8 to start the measurement. Hereat, in case that the timer 8 is working, the timer 8 is controlled to cancel the measurement, and then to start the measurement from the beginning. In this case, the timer 8 measures the relatively long time, that is, the second certain time, or other predetermined certain time; and when having finishing the measurement, the timer 8 sends the signal indicating the finish of the measurement to the control means 9. The control means 9, in the case of not receiving the signal from the third sensor 28 until the reception of the signal indicating the finish of the measurement, sends a control signal to the sound alarm/notification means 27 on the basis of the received signal indicating the finish of measurement, and thereby the sound alarm/notification means 27 generates an alarm. Here, in this case, the control means 9 doesn't energize the solenoid 26.

Accordingly, it is possible to warn the trouble that the door 2 continues not to be closed for a relatively long time after it was opened.

Hereat, by means of rotating the door 2 toward the closing direction by hand, the ball 23 is removed from the concave portion 22 by the force thereof, and thereby the door 2 can be closed. Here, at the position for first certain angle A, the ball 23 is pressed by the spring 24 and lock pin 25, and thereby the upper portion of the ball 23 engages into the concave portion 22 for first certain angle A of the lock plate 21.

However, the ball 23 removes from the concave portion 22 by means of a force closing the door 2 by hand, and then the door 2 rotates toward the closing direction.

In the meanwhile, although the convex portion 21*a* formed on the radially outer portion of the lock plate 21 is detected by the first sensor 6 and the detection signal is sent to the control means 9, the control means 9 doesn't send the control signal to the timer 8 by means of the built-in adapting distinction process not shown.

Accordingly, the door with a door closer 1 can keep the door 2 opened when the door 2 has opened to the second certain angle B. Further, in case that the door is kept opened for a relatively long time, it is possible to notify by ringing an alarm.

Hereat, the door with a door closer 1, although comprising the second sensor 10, can also comprise a selection switch, not shown, substitutionary for the second sensor 10; wherein the selection switch is arranged to select either the "release" or "not-release" of energizing the solenoid 26 after the elapse of a certain time interval; and by selecting the "not-release", the door 2 is kept opened, when it was opened to the first certain angle.

Further, as a modified embodiment for the control circuit of the aforementioned delay unit 5, the delay unit 5 can include, in addition to the control circuit shown in FIG. 3, a rotation angle detection sensor 29, shown by double dotted line, for continuously detecting the rotation angle of the door, and an arithmetic means 30, shown by the double dotted line, added to the control means 9.

Then, with the modified arrangement of the control circuit, the control means 9, when having detected the door 2 opened at an angle beyond the first certain angle less than the second certain angle by means of the rotation angle sensor 29, controls the timer 8 to start the measurement of the rest time, an excess delay time (an excess time for starting the closing motion of the door) defined as a time measured by the timer 8 multiplied by a certain coefficient is calculated by arithmetic means 30; when the control means 9 has detected the door returned and stopped at the first certain angle, the timer 8 is controlled to reset and start the measurement; and when the timer 8 has finished the measurement of the total delay time defined as the excess delay time added by a delay time, the first certain time, the control means 9 sends a control signal to the solenoid 26 as an electrical lock/unlock means, and then releasing the rotation lock, by means of the lock unit 7, of the rotation axis 3 of the door 2.

Therefore, with the modified arrangement of the control circuit, it is possible to extend the delay time for starting the closing motion of the door in proportion to the time, during which the door 2 is kept opened by a man/woman handling the door beyond the first certain angle less than the second certain angle. In other words, the man/woman handling the door can arbitrarily set the excess delay time of the door 2 during handling the door.

Further, in this case, the control means 9 can be also arranged such that when having detected, by means of the rotation angle sensor 29, that the door 2 stopped at an angle beyond the first certain angle less than the second certain angle, the control means 9 controls, during the time that the door 2 is stopped, the sound alarm/notification means 27 to work repeatedly at a certain time interval or notify repeatedly using sound at a certain time interval.

In such occasion, it is possible to inform the user the time, during which the door 2 is kept opened with angle beyond the first certain angle less than the second certain angle, and the user can easily set the excess delay time for the door.

According to the control circuit in accordance with the modified embodiment, at the first certain angle, the closure of the door 2 can be delayed for a first certain time, at the second certain angle, the door 2 is kept opened, at an angle beyond the first certain angle less than the second certain angle, the delay time for starting the closing motion of the door 2 can be set arbitrarily.

Figure 5:
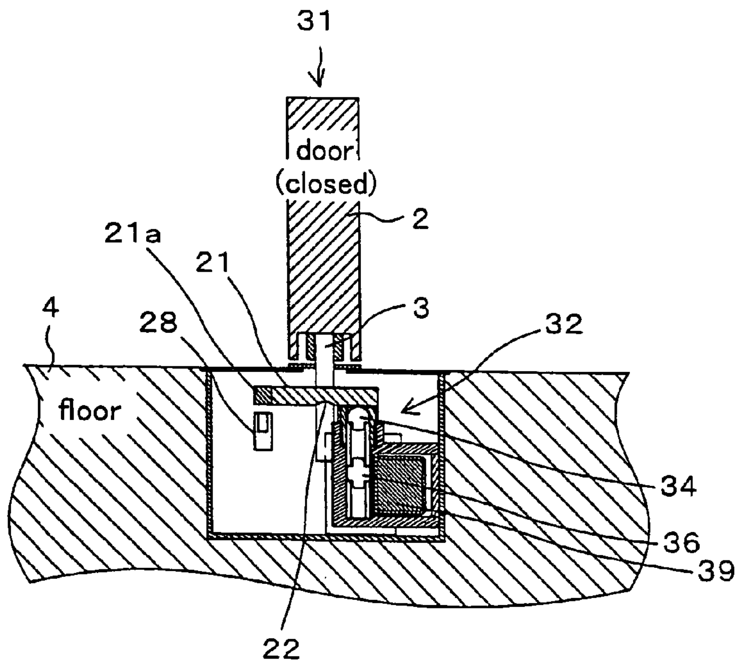
FIG. 5 is a frontal view of the longitudinal cross-section of a door with a door closer according to the second embodiment.

In FIG. 5, the symbol 31 denotes the door with a door closer according the second embodiment of the present invention.

The door with a door closer 31 is arranged such that a lock unit 32, which is an electrical lock/unlock means of power saving type, is provided substitutionary for the lock unit (indicated by the symbol 7 in FIG. 1), which is an the electrical lock/unlock means of the delay unit (indicated by the symbol 5 in FIG. 1) provided to the aforementioned door with a door closer (indicated by the symbol 1 in FIG. 1).

Figure 6:
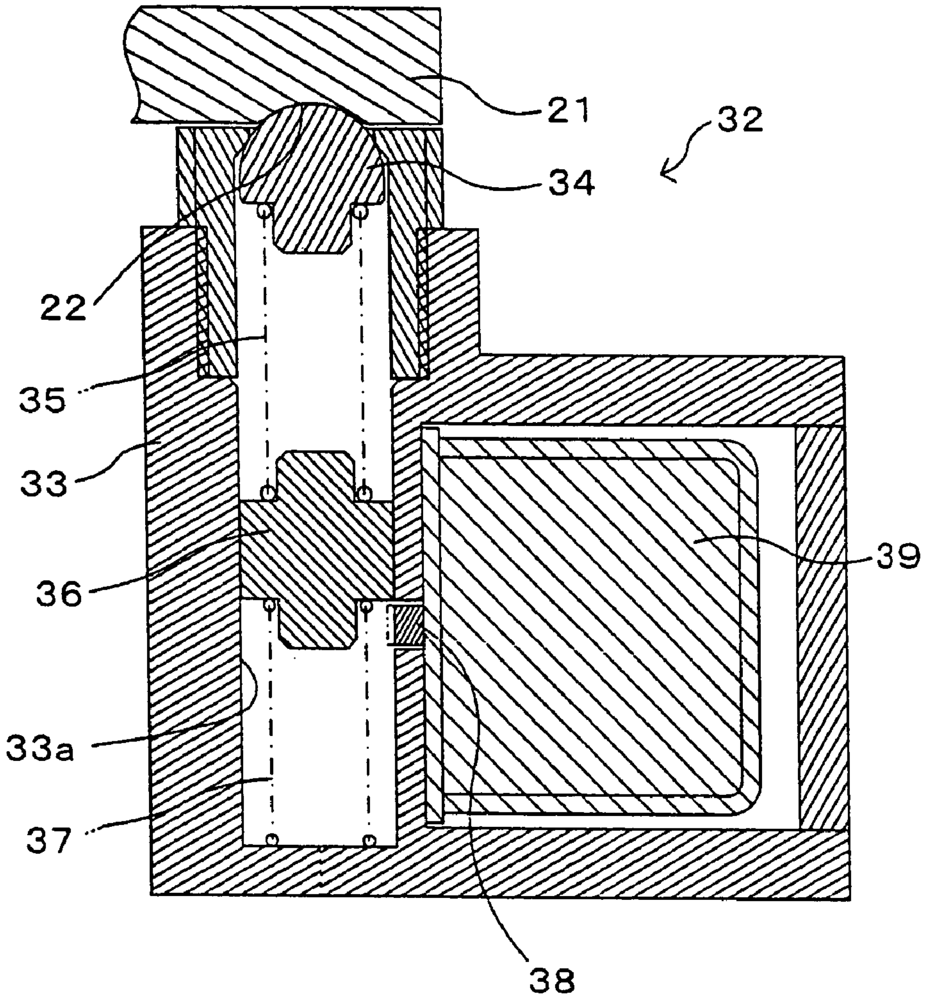
FIG. 6 is a frontal view of the longitudinal cross-section of the lock unit shown in FIG. 5.

The lock unit 32 includes: the lock plate 21, tightly fixed to the rotation axis 3 of the door 2, for locking the rotational motion of the rotation axis 3; as shown in FIG. 6, a lock member 34, laid inside a housing 33, for capable of freely engaging into the concave portion 22 formed on the lower surface of the lock plate 21; a front spring 35 for pressing the lock member 34; a lock piston 36 freely slidable inside the cylindrical hollow 33*a* formed in the housing 33 and capable of freely pressing the front spring 35; a rear spring 37 for pressing the lock piston 36; a movable pin 38 for locking the sliding movement of the lock piston 36 by means of moving in and out of the housing 33; and a solenoid 39 for moving the movable pin 38 in and out.

Preferably, the front spring 35 consists of a relatively stiff (higher elasticity) spring, and the rear spring 37 consists of a relatively soft (lower elasticity) spring.

Further, the solenoid 39 includes a first solenoid, not shown, for working so as to stick out the movable pin 38 into the housing, a second solenoid for working to prevent the movable pin 38 from sticking out into the housing.

The solenoid unit 39, alternatively, can also be arranged that a switching unit, not shown, for switching the plus and minus terminals of the solenoid 39 is provided, and the movable pin 38 is moved in and out depending on the switching by the switching unit.

In either case, the solenoid 39 is energized only when moving the movable pin 38 in and out, and when the movable pin 38 is at rest, the solenoid 39 isn't energized, i.e., in the power-off mode, thereby saving the electric power. Further, the state is maintained when the movable pin 38 is at rest.

Figure 7:
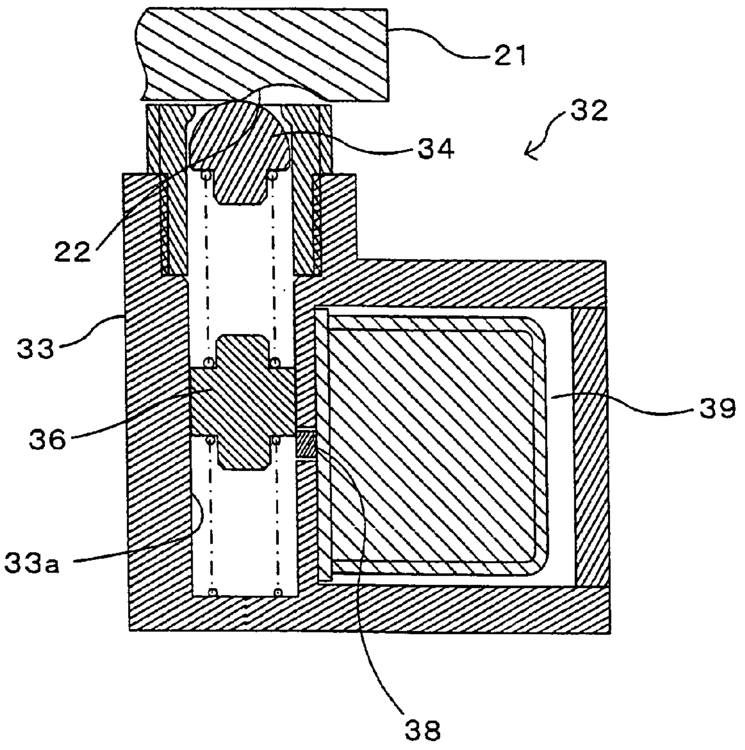
FIG. 7 is a view corresponding to FIG. 6.
Figure 7:
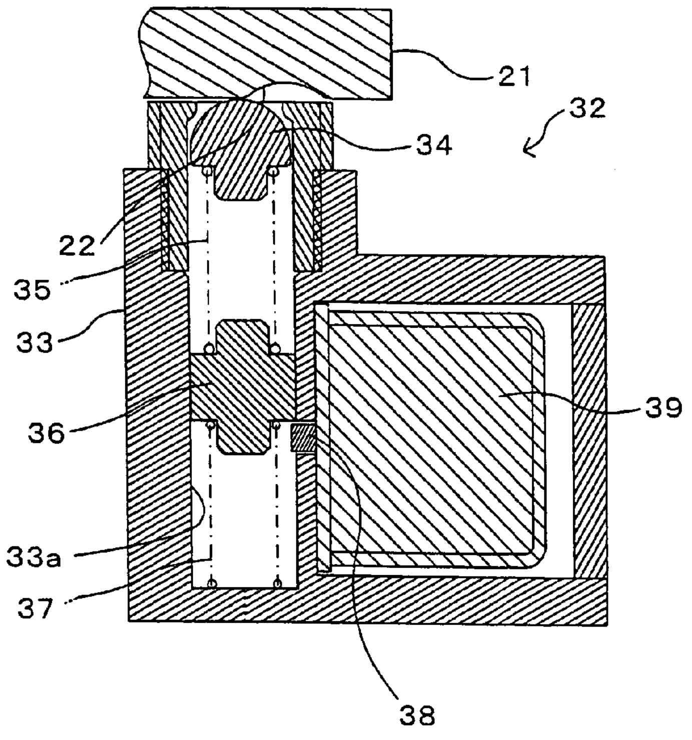

Moreover, the lock unit 32 is arranged such that, as shown in FIG. 7(*a*), in case that the movable pin 38 doesn't stick out inside the housing 33, the lock piston 36 becomes slidable; and when the lock member 34 is pressed into the lock plate 21, the lock member 34 is supported by the counter force of the front spring 35 and rear spring 37, thereby being prevented from edge back.

Thus, in case that the movable pin 38 doesn't stick out inside the housing 33, the counter force of both the front spring 35 and rear spring 37 is relatively weak, that is, in case that the movable pin 38 doesn't stick out inside the housing 33, the lock member 34 is easy to move backward owing to the relatively weak elasticity brought by the serial combination of the front spring 35 and rear spring 37, thereby easily to remove from the concave portion 22 of the lock plate 21.

In the meanwhile, the lock unit 32 is arranged such that, as shown in FIG. 7(*b*), in case that the movable pin 38 sticks out into the housing 33, the backward sliding movement of the lock pin 36 is locked, and when the lock member 34 has pressed by the lock plate 21, the lock member 34 is supported by the counter force of only the front spring 35, thereby being prevented from edge back.

Thus, in case that the movable pin 38 sticks out inside the housing 33, the lock member 34 is prevented from the backward movement owing to the relatively strong counter force of the front spring 35, that is, the relatively high elasticity of the front spring 35 alone, thereby hard to remove from the concave portion 22 of the lock plate 21.

Therefore, by controlling the energization of the solenoid 39 of the lock unit 32, the lock unit 32 has actions and effects similar to that of the lock unit 7 by working the lock member 34 with a manner similar to the ball 23 of the lock unit 7 according to the first embodiment.

Thus, the door with a door closer 31 according to the second embodiment makes it possible to fabricate the lock unit 32 compactly and economically and save the power supplied for the electric lock-unlock means.

Figure 8:
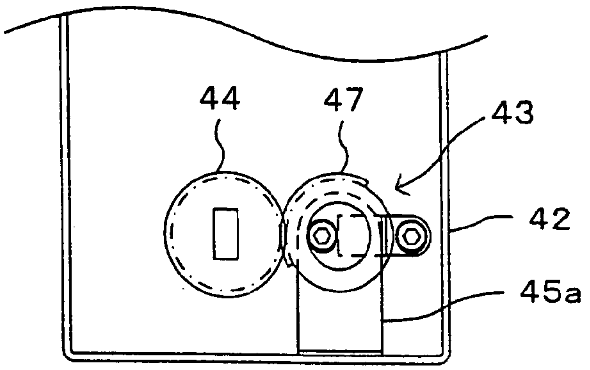
FIG. 8(*a*) is a frontal view of the longitudinal cross-section of a door with a door closer according to the third embodiment, and FIG. 8 (*b*) is a partial cross-sectional view of the delay unit of the same.
Figure 8:
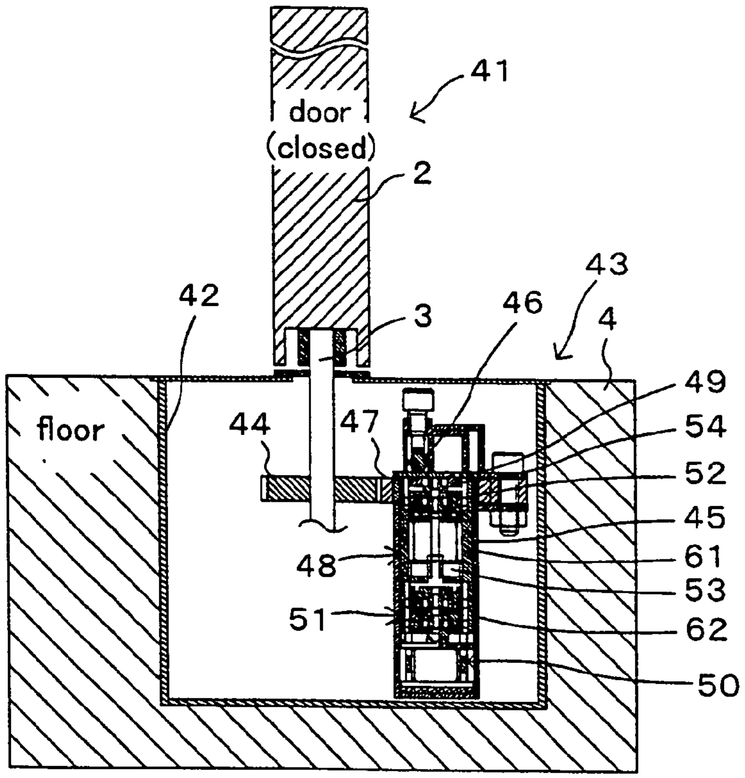
Figure 9:
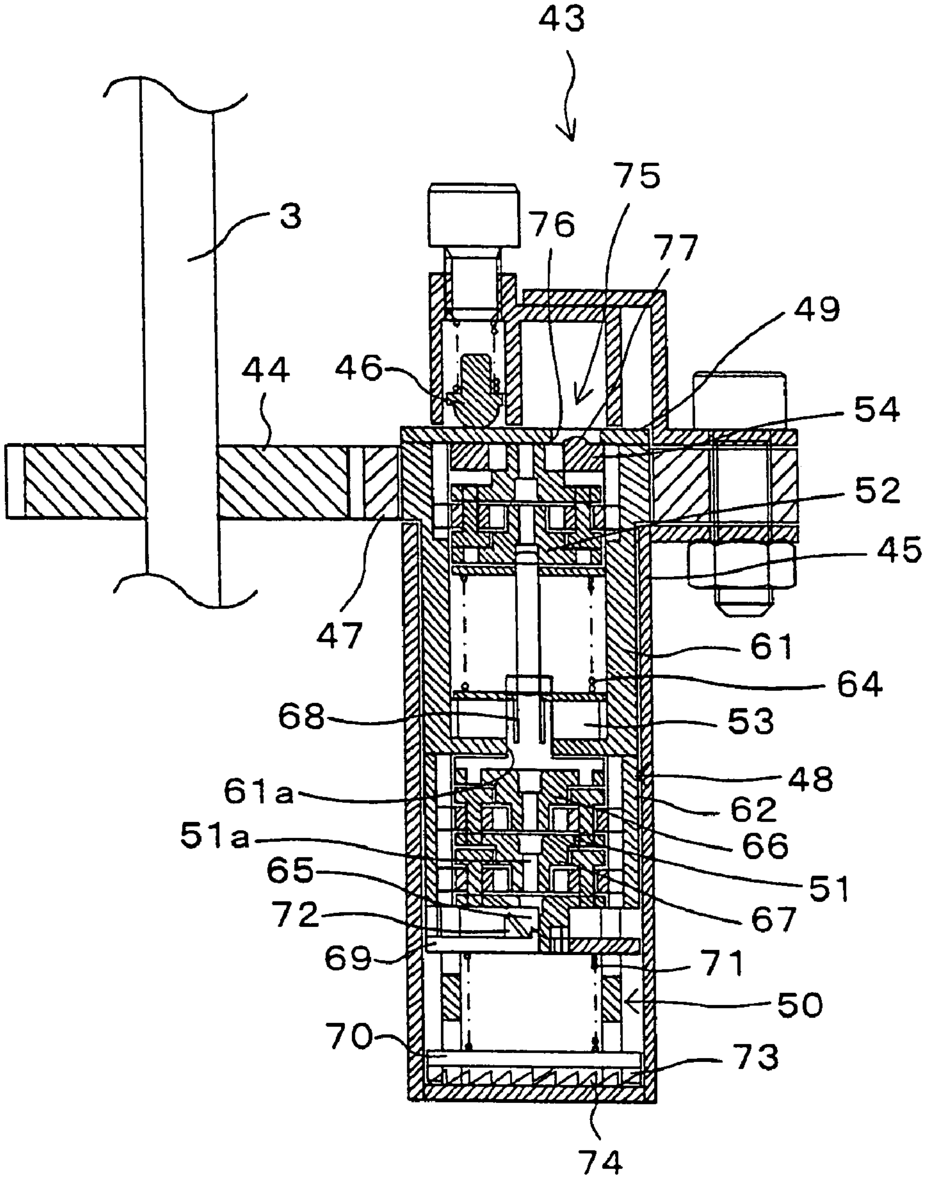
FIG. 9 is an enlarged frontal view of the cross-section of the delay unit shown in FIG. 8.

In FIGS. 8 and 9, the symbol 41 denotes a door with a door closer according to the third embodiment of the present invention. The door with a door closer 41 comprises: a door closer (not shown, generally installed to the rotation axis of the door) for pressing the door 2 toward the closing direction; and a delay unit 43 is installed inside the case 42 embedded under the floor surface 4 near the lower edge portion of the rotation axis 3 of the door 2, and provided for locking the rotation of the rotation axis 3 of the door 2 thereby releasing thereafter.

The delay unit 43 includes: a main gear 44 tightly fixed to the lower edge portion of the rotation axis 3 of the door 2; an outer case 45, to which a sub-gear 47 meshing with the main gear 44 is tightly fixed; a lock pin 46 provided on the upper portion of the outer case 45 and being pressed; an inner case 48 tightly fixed to the case 42 via a bracket 45*a* and mounted freely rotatably inside the outer case 45; a lock plate 49 provided on the upper edge of the inner case 49; a clutch 50 laid inside the inner case 48; rotation speed increase/decrease planetary gear units 51, 52 for changing the rotation speed; a spiral spring 53 wound up by the rotation of the rotation speed increase planetary gear unit 51; and a timer plate 54 rotated by the winding-off of the spiral spring 53 and unlocking the lock pin 46 after a predetermined third certain time. Here, the rotation ratio of the main gear 44 to sub-gear 47 is set to 1:1, that of the main gear 44 to the rotation speed increase planetary gear unit 51 is set to 1:16, and that of the main gear 44 to the rotation speed decrease planetary gear unit 52 is set to 4:1.

Further, the inner case 48 consists of an upper/lower inner cases 61, 62; wherein inside the upper inner case 61, the spiral spring 53, spring 64, rotation speed decrease planetary gear unit 52, and timer plate 54 are aligned in turn from the lower to upper; the rotation speed decrease planetary gear unit 52 and timer plate 54 are pressed upward by the spring 64; the timer plate 54 is pressed to contact with the lock plate 49; and the rotation speed increase planetary gear unit 51 is aligned inside the lower inner case 62. Further, a nail 65 sticking downward is provided on the lower edge portion of the lower inner case 62.

Moreover, the rotation speed increase planetary gear unit 51 has a two stage configuration consisting of an upper planetary gear unit 66 and lower planetary gear unit 67, and is formed so as to be freely connectable with the rotation axis 68 of the spiral spring 53 via an opening 61*a* formed on the bottom of the upper inner case 61.

The rotation speed decrease planetary gear unit 52 is also arranged so as to decrease the rotation speed of the timer plate 54 depending on the amount of the winding-off of the spiral spring 53.

Further, below the rotation speed increase planetary gear unit 51, upper/lower clutch plates 69, 70 composing the clutch 50 are aligned so as to be pressed in the separate direction each other by a spring 71 laid between them; a nail 72 sticking upward is provided above clutch plate 69; and a saw-toothed nail 73 sticking downward is provided on the lower outer edge portion of the lower clutch plate 70. In the meanwhile, on the upper surface of the inner bottom portion of the outer case 45, there is provided a nail 74, which meshes the nail 73, allows one way rotation of the lower clutch plate 70, and locks the rotational motion toward the opposite direction.

Moreover, a lock-unlock mechanism 75 consists of the lock pin 46, lock plate 49, and timer plate 54.

Besides, on the lock plate 49, a lock hole 76 is opened for engaging the lock pin 46, when the door 2 has been opened to the first certain angle, for example 90 deg.

In the meanwhile, a convex 77 sticking upward capable of freely engaging into the lock hole 76 is also formed on the upper surface of the timer plate 54.

Figure 10:
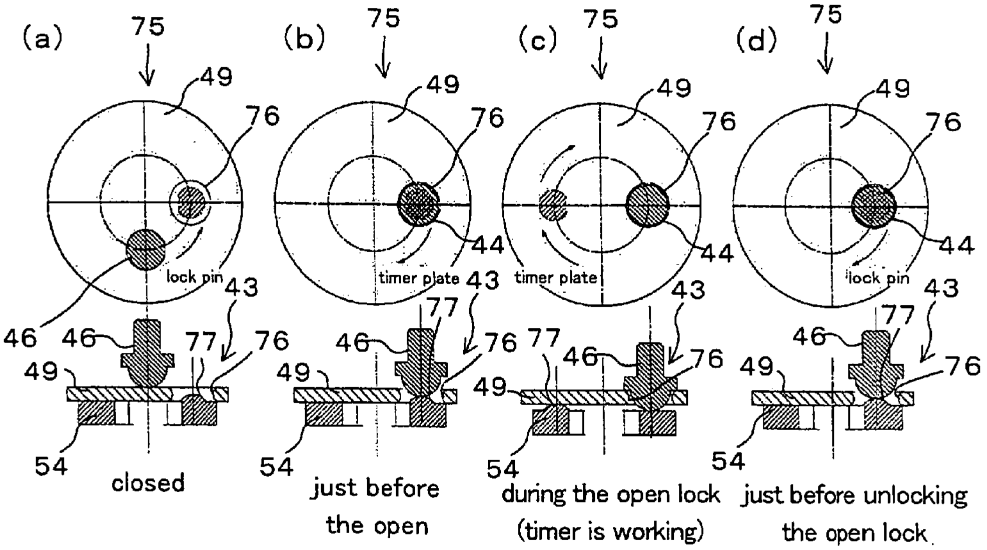
FIGS. 10 (*a*)~(*d*) are views each showing a working state of the lock-unlock mechanism of the door with a door closer shown in FIG. 8.

Now, referencing to the FIGS. 8-10, an explanation is given on the working of the door with a door closer 41. When the door 2 has been opened to the first certain angle, for example 90 deg., the main gear 44 rotates quarter turn together with the rotation axis 3; by means of the main gear 44, the sub-gear 47 rotates; and thereby the outer case 45 tightly fixed to the sub-gear 47 rotates quarter turn.

At this time, the outer case 45 rotates quarter turn relative to the lock plate 49; the lock pin 46 engages into the lock hole 76 of the lock plate 49; the rotational motion of the outer case 45 is locked; and thereby the rotation of the door 2 is locked.

In the meanwhile, by means of the door 2 having been opened to 90 deg., the outer case 45 rotates quarter turn relative to the inner case 48; the rotation speed increase planetary gear unit 51 rotates via upper/lower clutch plates 70, 69 by meshing the nail 74 provided on the outer case 45 with the nail 73 provided on the lower clutch plate 70, that is, upper/lower planetary gear units 66, 67 rotate, and thereby the spiral spring 53 is wound up by 4 turns.

Further, by means of the rotation of the rotation speed increase planetary gear unit 51, the rotation speed decrease planetary gear unit 52 rotates; by means of the rotation of the rotation speed decrease planetary gear unit 52, the timer plate 54 rotates one turn; and thereby the convex portion 77 of the timer plate 54 removes from the lock hole 76 of the lock plate 49.

Moreover, when the outer case 45 has finished to rotate quarter turn, the nail 72 of the upper clutch plate 69 engages with the nail 65 of the lower inner case 62 to press down the upper clutch plate 69; and thereby the engagement of the central axis 51*a* of the rotation speed increase planetary gear unit 51 with the upper clutch plate 69 is lost.

When the wound up spiral spring 53 is unwound by four turns by means of the remove of the rotation speed increase planetary gear unit 51 from the upper clutch plate 69, the timer plate 54 rotates one turn toward the opposite direction. At this time, since the timer plate 54 is pressed to the lock plate 49 and the convex portion 77 sticking out from the timer plate 54 is pressed to contact with the lock plate 49, the timer plate 54 rotates slowly, and the time taken for the rotation is used as a time from timer (hereinafter, referred to as "third certain time"). Then, the convex portion 77 of the timer plate 54 engages into the lock hole 76, the convex portion 77 presses up the lock pin 46, and thereby the lock pin 46 is raised.

When the lock pin 46 is raised, the lock pin 46 removes from the lock hole 76 by means of the weight of the door 2 and the action of the door closer, and then the door 2 starts closing. At the time, the nail 73 of the lower clutch plate 70, with engaging with the nail 72 of the upper clutch plate 69 and being pressed downward, climbs up and down over the nail 74 provided with the outer case 45, and thereby the outer case 45 rotates to return to the initial position. Here, when the door 2 is closed, the nail 72 of the upper clutch plate 69 stays engaged and pressed downwards, and when the door 2 starts opening again, the engagement of the nail 72 is lost, and thereby the upper clutch plate 69 is raised.

Accordingly, the door with a door closer 41 can automatically close the door 2 by means of the delay unit 43 after the elapse of the third certain time since the door 2 was opened, and also be installed in case that the door closer is embedded inside the door 2, wall, or floor surface thereby being not exposed, since the delay unit 3 isn't provided with the door closer. Besides, since the delay unit 43 consists of the mechanical members, wiring works and the like are unnecessary.

Figure 11:
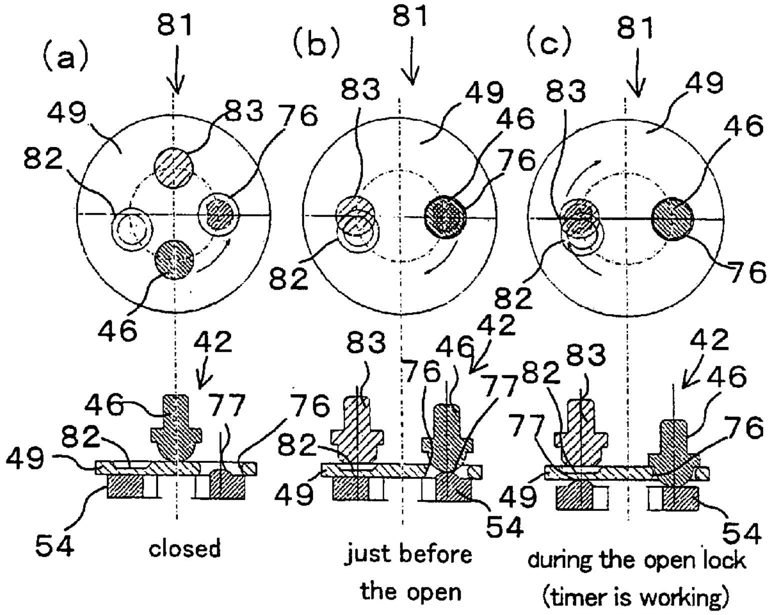
FIGS. 11 (*a*)~(*d*) are views each showing a working state of the lock-unlock mechanism of the door with a door closer obtained by improving that shown in FIG. 8.
Figure 11:
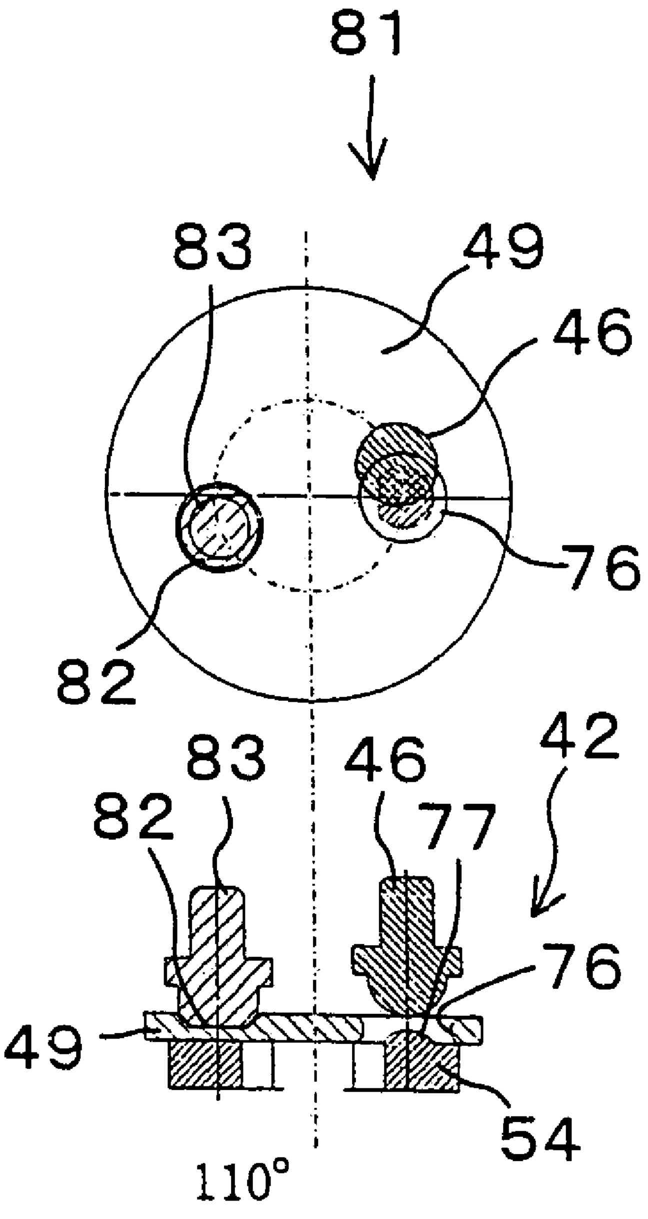

In FIG. 11, the symbol 81 denotes an improved lock-unlock mechanism of the lock-unlock mechanism (indicated by the symbol 75 in FIG. 10) of the door with a door closer (indicated by the symbol 41 in FIG. 8) according to the third embodiment of the present invention. The improved lock-unlock mechanism has a function such that the door (indicated by the symbol 2) is kept opened, when having opened to the second certain angle (for example, 110 deg.), in addition to that of the door with a door closer (indicated by the symbol 41 in FIG. 8).

The lock-unlock mechanism 81 has a structure of lock plate 49 with a lock concave portion 82 at a certain position; and the lock concave portion 82 is a concave formed on the upper surface of the lock plates 49 so as to engage with a second lock pin 83 provided differently from the lock pin 46, when the door is opened to the second certain angle. Therefore, the lock concave portion 82 is formed at the position, where the lock pin 83 locates when the door is opened to the second certain angle.

According to the aforementioned lock-unlock mechanism 81, when the door has been opened to the second certain angle, the lower edge portion of the second lock pin 83 engages into the lock concave portion 82, the door is locked opened, and the state is maintained. Here, although the lock pin 46 engages into the lock hole 76 when the door has been opened to the second certain angle, the lock pin 46 removes from the lock hole 76 by the force further opening the door, and thereby the door can be opened to the second certain angle. Further, although the lock-unlock mechanism 75 and delay unit 43 work when the door has been opened to the first certain angle, the lock-unlock mechanism 81 maintains the aforementioned locked state without being influenced by it.

Regarding the closure of the door, when the door has been moved toward the closing direction by hand, the second lock pin 83 removes from the lock concave portion 82 by the force added to the door, and then the door 2 starts closing by means of the action of the door closer.

Accordingly, the lock-unlock 81 is extremely convenient, since it can keep the door opened depending on the opening angle of the door, and also close the door after the elapse of the certain time since the door was opened.

Figure 12:
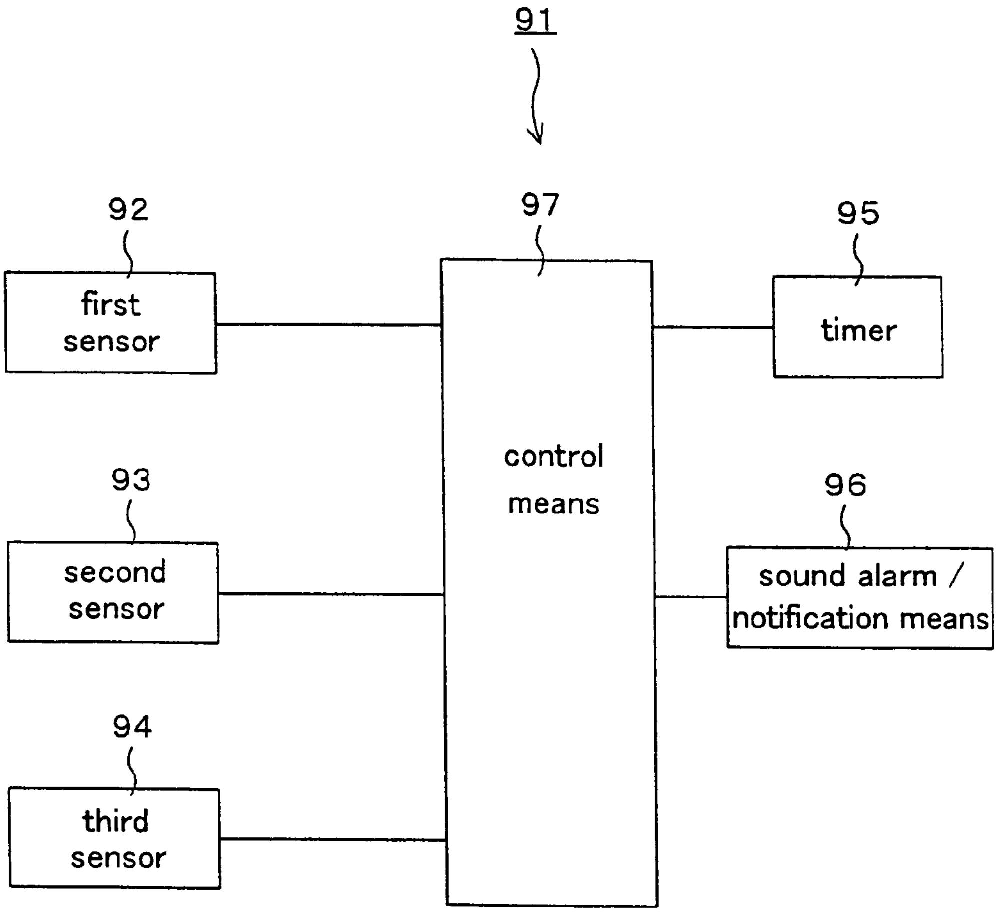
FIG. 12 is a schematic view of an electronic circuit additively provided with the door with a door closer according to the third embodiment of the present invention.

In FIG. 12, the symbol 91 denotes an electric circuit additionally mounted on the door with a door closer, to which the lock-unlock mechanism 81 is attached. The electric circuit 91 includes a first sensor 92 for detecting the door opened to the first certain angle, a second sensor 93 for detecting the door opened to the second certain angle, a third sensor 94 for detecting the door closed, a timer 95, a sound alarm/notification means 96, and a control means 97, with which they 92-96 are electrically connected. Here, the sound alarm/notification means 96 should not be construed as limited, but it can be another alarm/notification means which warns and/or notifies by using media without sound.

Then, when the first sensor 92 has detected the door opened to the first certain angle, the control means 97 controls timer 95 to start; and when having received no signal from the third sensor 94 within the predetermined fourth certain time (is set longer than the time from timer (the third certain time) which is a rotation time of the timer plate 54) measured by the timer 95, the control means 97 controls the sound alarm/notification means 96 to ring an alarm, thereby notifying that the delay unit 43 doesn't work.

When the second sensor 93 has detected the door opened to the second certain angle, the control means 97 also controls the timer 95 to start; and when having received no signal from the third sensor 94 within the relatively long fourth certain time measured by the timer 95, the control means 97 controls the sound alarm/notification means 96 to ring an alarm, thereby notifying that the door stays opened for a relatively long time.

Thus, the electric circuit 91 can detect the abnormal working of the delay unit 43 and notify by means of the sound alarm/notification means 96 that the door stays opened for a long time, thereby improving the safety of the door.

Here, it is also possible to arrange such that by configuring the sound alarm/notification means 96 capable of ringing a relatively small sound(s) for notification, the control means 97 controls the sound alarm/notification means 96 to ring a sound for notification based on the any one or more signal(s) from the first sensor 92, second sensor 93, third sensor 94, and timer 95, and further in order to distinguish it/them from the other, the control means controls it to ring a different sound(s).

Besides, although the sound alarm/notification means 96 is provided with the electric circuit 91, a unit for the notification using light, e-mail, telephone, and the like is also possible alternative to the sound alarm/notification means 96.

Further, although the third sensor 94 is provided with the electric circuit 91, it is also possible to provide, alternative to the third sensor 94, the first sensor 92 and second sensor 93, each rings an alarm(s) when the sensor 92, 93 continues the detection of the same state for relatively long time.

Moreover, it is also possible to provide with a circuit, the electric circuit 91 without the second sensor 93, to the door with a door closer 41 having the lock-unlock mechanism 75. In such case, it is also possible to expect actions and effects based on the detection by the first sensor 92 and third sensor 94.

Hereat, the door with a door closer 41 should not be construed as limited to one having the aforementioned arrangement, but it can have other arrangements such that, for example, it has another transmission gear alternative to the rotation speed increase/decrease planetary gear units 51, 52, and thereby the similar effects can also be expected in this case.

Further, although the lock units 7, 32 or the delay unit 43 according to the present invention is provided under the floor surface, as mentioned above, the location should also not be construed as limited under the floor surface, but it is also possible to install it/them inside the building such as ceiling, wall, etc.

Moreover, the location of the third sensor 28, 94 should not be construed as limited to the aforementioned position, but it is also possible to install it/them at another location such as tip end of the door, door frame, and the like in order to improve the accuracy for confirming the door closed.

Figure 13:
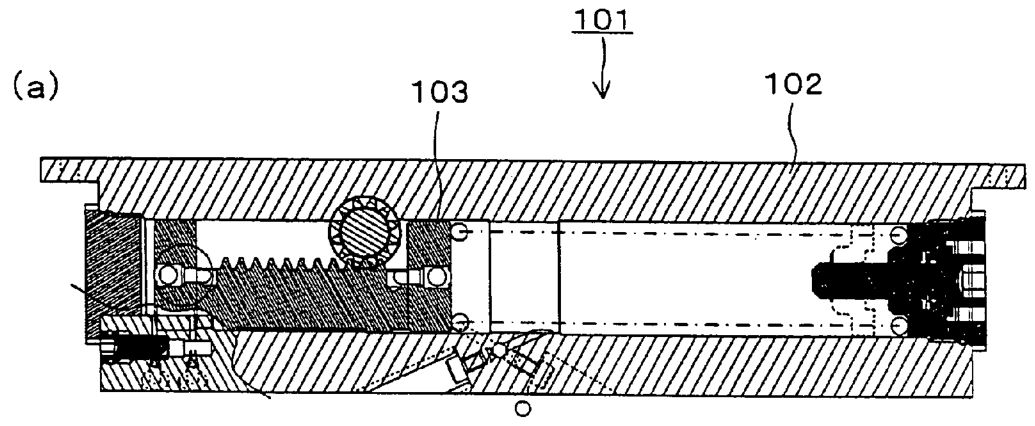
FIG. 13 (*a*) is a top view of the longitudinal cross-section of a door closer with delayed unit according to the forth embodiment of the present invention and FIG. 13 (*b*) is a front view of the same.
Figure 13:
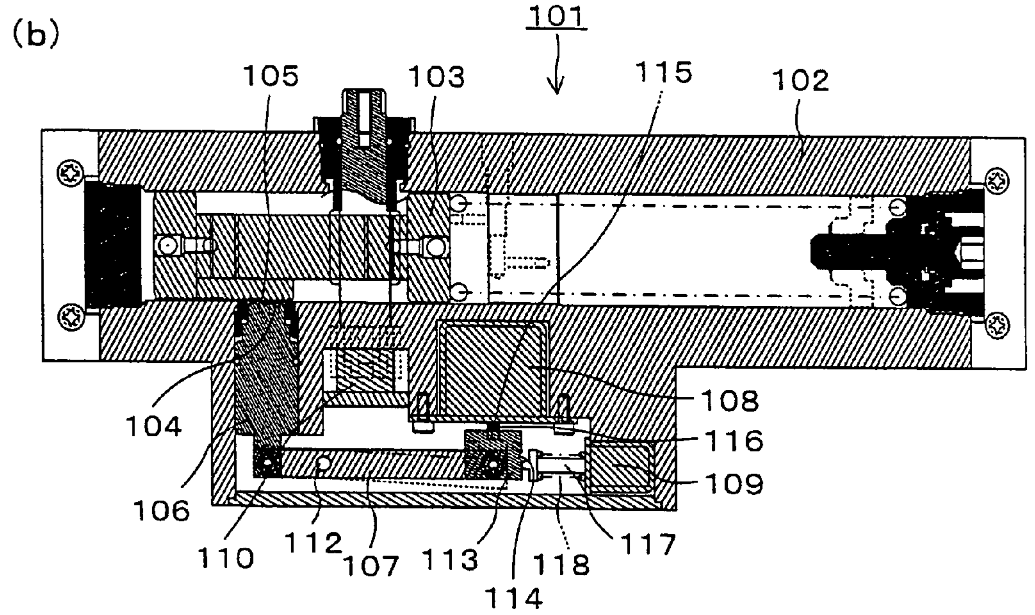

In FIG. 13, the symbol 101 denotes a door closer with a delay unit according to the fourth embodiment of the present invention. The door closer with a delay unit 101 comprises: an oil cylinder 102 and piston 103, which provide with a door closing function; further, a mesh portion 104 with a plurality of teeth continuously formed on the side surface of the piston 103; a lock pin 106 with a meshing stick portion 105, which is capable of freely engaging into the mesh portion 104, and capable of freely moving in and out inside the oil cylinder 102, formed at the tip end; a rod 107 for moving the lock pin 106 in and out inside the oil cylinder 102; a push type-main solenoid unit 108 capable of freely pressing the rod 107; a push-type sub-solenoid unit 109 capable of freely holding the pressed rod 107 at the position assumed by the press; and a rotation angle sensor 110 for continuously detecting the rotation angle of the door (not shown).

The rod 107 is pivotally supported capable of freely swaying, the lower edge portion of the lock pin 106 is pivotally supported at the tip end portion of the rod 107, and a block member 113 is tightly fixed to the proximal end of the rod 107. In addition, the block member 113 has a concave portion 14 formed at the proximal end thereof and also a concave portion 115 formed at the upper end.

Further, the main solenoid unit 108 is aligned above the block member 113; the tip end of a movable pin 116, which sticks out by means of the energized main solenoid unit 108, is inserted inside the concave portion 115 formed on upper the edge portion of the block member 113; the sub-solenoid unit 109 is positioned behind the block member 113; the tip end portion of the movable member 117, which retreats by means of the energization of the sub-solenoid unit 109, is formed capable of freely inserting into the concave portion 114 formed in the proximal edge portion of the block member 113; and the movable member 117 is pressed by a spring 118 so as that the tip end portion 114 of the movable member 117 inserts into the concave portion 114.

Figure 14:
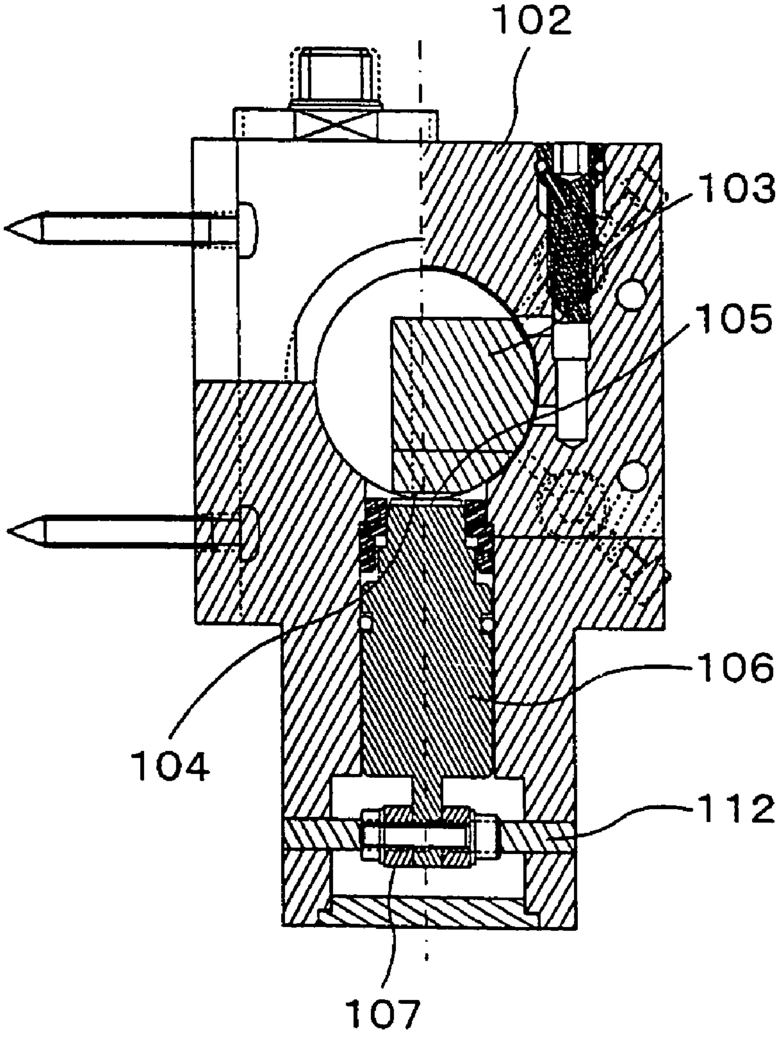
FIG. 14 is an enlarged side view of the longitudinal cross-section of a door closer with a delayed unit of the forth embodiment of the present invention.

FIG. 14 illustrates how the lock pin 106 and the piston 103 mesh with each other and how the lock pin 106 and rod 107 are connected with each other.

Figure 15:
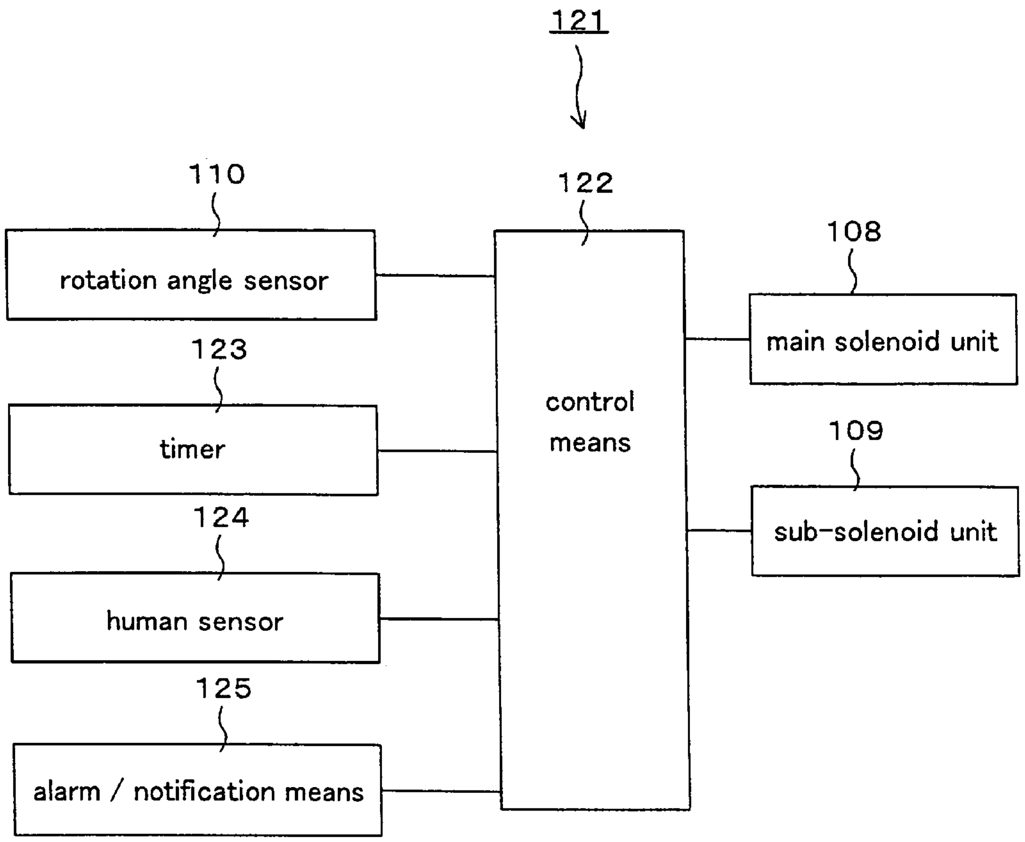
FIG. 15 is a diagram of a control circuit to be mounted on the door closer with a delayed unit of the forth embodiment of the present invention.

Besides, the door closer with a delay unit 101 also comprises a control circuit 121 shown in FIG. 15; wherein the control circuit 121 has a control means 122, with which the main solenoid unit 108, sub-solenoid unit 109, and rotation angle sensor 110 are electrically connected respectively; and a timer 123 for measuring a time, a human sensor 124 for detecting a man/woman, and an alarm/notification means 125 are also electrically connected; and the main solenoid unit 108, sub-solenoid unit 109, rotation angle sensor 110, timer 123, human sensor 124 and alarm/notification means 125 are controlled by the control means 122. Here, the timer 123 can also be built-in inside the control means 122.

Thereby, in the door closer with a delay unit 101, when the rotation angle sensor 110 has detected that the door stopped its rotation at an arbitrary open angle, the control means 122 controls the timer 123 to start the measurement of the stop time; when the door starts closing at the measured stop time longer than or equal to a fifth certain time (for example, 2 seconds) and less than a sixth certain time (for example, 7 seconds), the control means 122 controls the main solenoid unit 108 to work; thereby the main solenoid unit 108 sticks the movable pin 116 out; the movable pin 116 is inserted into the concave portion 115, thereby pressing the rod 107; the lock pin 106 moves upwards by means of the sway of the pressed rod 107 around the fulcrum 112; and the lock pin 106 meshes its mesh stick portion 105 with the mesh portion 104 of the piston 103, thereby stopping the motion of the piston 103. In the meanwhile, when the rod 107 has been pressed by the movable pin 116, the tip end of the movable member 117 pressed by the spring 118 is inserted into the concave portion 114; and thereby the sub-solenoid unit 109 holds the rod 107 in the rest state and the piston 103 in the rest state, thereby the door in the rotation stop state. On the other hand, the control means 122, when having controlled the main solenoid unit 109 to work, controls the timer to start the measurement of the time; when the timer 123 has finished the measurement of the delay time, a predetermined seventh certain time, the control means 122 controls the sub-solenoid unit 109 to energize, thereby retreating the movable member 117, releasing the hold of the rod 107, dropping the lock pin 106 down by means of its own weight, and then releasing the rest state of the piston 103 and door. Thereby, the door rotates toward the closing direction by means of the door closer function of the door closer with a delay unit 101.

Hereat, in case that a man/woman is detected by the human sensor 124 during the measurement of the delay time by the timer 123, the control means 122 compares the remained time of the delay time, a seventh certain time, with a human detection delay time, a predetermined eighth certain time, and controls the timer to measure the resulting longer time as a remaining delay time; and when the timer has finished the measurement of the remaining delay time, the control means 122 controls the sub-solenoid unit to energize. In addition, in case that a man/woman is detected during the measurement of the remaining delay time, a similar process is also repeated, and thereby extending the remaining delay time. Further, in case that a man/woman is detected by the human sensor 124 during the closing movement of the door, the control means 122 controls the main solenoid unit 8 to energize to immediately stop the rotation of the door, and also a timer 123 to start the measurement of the human detection delay time, the eighth certain time; and when the timer 123 has finished the measurement of the eighth certain time, the control means 122 controls the sub-solenoid unit 109 to energize.

Here, the alarm/notification means 125 is arranged to alarm and/or notify when the door is opened for a long time, however, the detail description of its arrangement and action are omitted. Further, the alarm/notification means 125 can also be arranged such that when the rotation angle sensor 110 has detected the door opened at an arbitrary angle in the rest state, the alarm/notification means, during the door being at rest, is controlled to work at a certain time interval or notify the time by means of a voice at a certain time interval. For example, it can also be arranged to notify with voice, such as 10 seconds, 20 seconds, 30 seconds, and the like. Alternatively, another means is also allowable as an alarm/notification means, such as turning buzzer sound, light etc. on and off at a certain time interval.

Accordingly, when the door was opened and at rest at an arbitrary angle for the fifth certain time, the door closer with a delay unit 101 can hold the door opened further for sixth certain time, automatically close the door after the elapse of the sixth certain time, and be fabricated compactly and economically.

Further, the door closer with a delay unit 101, when having detected a man/woman, can delay the closing movement of the door, and thereby secure him/her safety.

Figure 16:
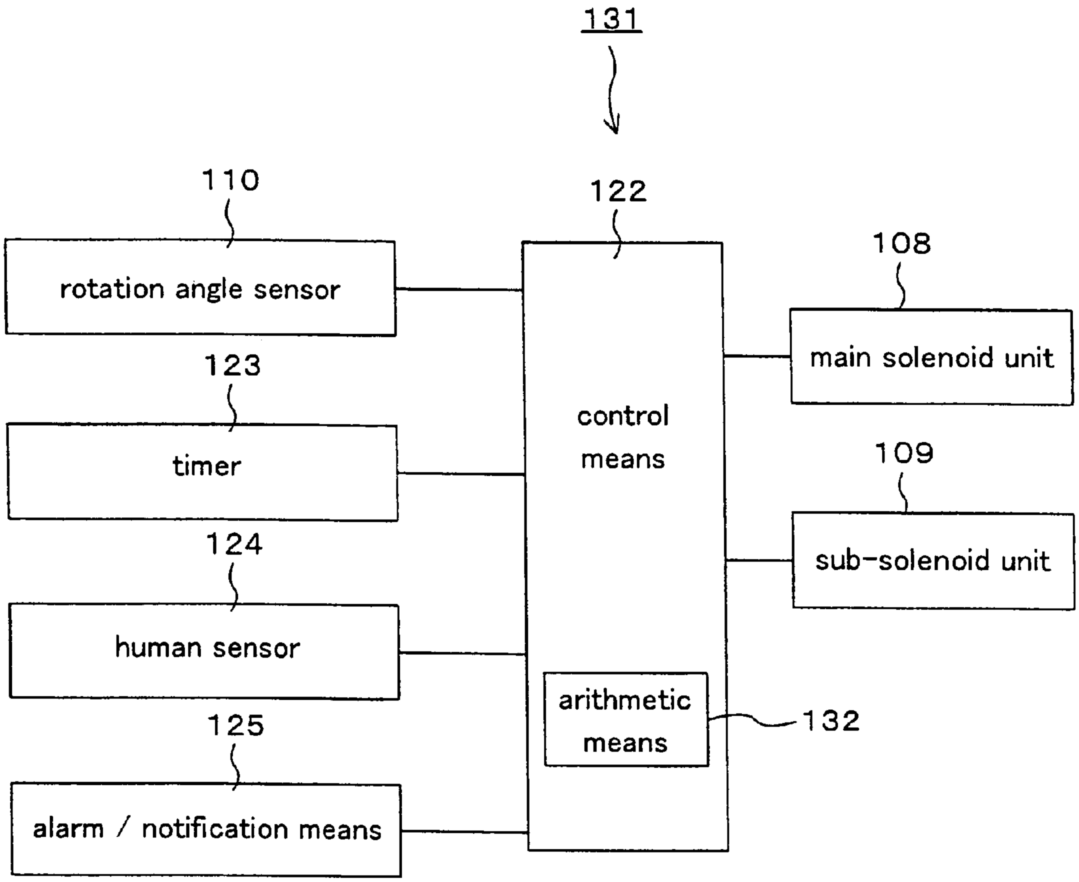
FIG. 16 is another diagram of the control circuit to be mounted on the door closer with a delayed unit of the forth embodiment of the present invention.

In FIG. 16, the symbol 131 denotes a control circuit provided with the door closer with a delay unit 101 according to the fifth embodiment of the present invention.

The control circuit 131 is arranged as the control means 122 of the control circuit (indicated by the symbol 121 in FIG. 15) with an arithmetic means 132.

The control circuit 131 can control with a manner similar to the control circuit (indicated by the symbol 121 in FIG. 15) and becomes possible to control such as described hereinafter.

The control means 122 is arrange such that when the rotation angle sensor 110 has detected that the door stopped its rotation with an arbitrary open angle, the control means 122 controls the timer 123 to start the measurement of the time; and in case that the time measured by the timer 123 taken for starting the closure of the door is longer than or equal to the sixth certain time, the arithmetic means 132 is controlled to calculate the excess delay time by multiplying the time beyond the sixth certain time by a certain coefficient; in the meanwhile, when the door has started closing, the control means 122 controls the main solenoid 108 to work and also the timer to be reset and start the measurement of the time; and when the timer 123 has finished the measurement of the total delay time defined as a sum of the delay time, namely, the seventh certain time, and the excess delay time, the control means 122 controls the sub-solenoid unit 109 to energize.

For example, in case that a man/woman handling the door opened the door to an arbitrary angle (for example, 80 deg.) and then releases it after having stopped it for a time longer than the sixth certain time (for example, 7 seconds), for example 10 seconds, the excess time beyond 7 seconds is 3 seconds, the excess delay time for the coefficient of 10 can be calculated as: (calculation) (10 −7) second×10=30 seconds, and the total delay time with the seventh certain time of 10 second can be calculated as: (calculation) 10 seconds+30 seconds=40 seconds. Similarly, in case that the door was opened and released after 20 seconds stop, the total delay time with the coefficient of 10 can be calculated as: (calculation) 10 seconds+(20−7) seconds×10=140 seconds.

Hereat, in case that a man/woman is detected by the human sensor 124 during the measurement of the total delay time by the timer 123, the control means 122 compares the remaining time of the total delay time with the human detection delay time, the predetermined eighth certain time, and controls the timer 123 to start the measurement of the resulting longer time as a remaining delay time; and when the timer 123 has finished the measurement of the remaining delay time, the control means 122 controls the sub-solenoid unit 109 to energize. Further, in case that a man/woman is detected by the human sensor 124 during the closing rotation, the control means 122 controls the main solenoid unit 108 to energize, thereby immediately stopping the rotation of the door, and the timer 123 is controlled to start the measurement of the human detection delay time, the eighth certain time; and when the timer 123 has finished the measurement of the eighth certain time, the control means 122 controls the sub-solenoid unit 109 to energize.

Accordingly, the door closer with a delay unit having the control circuit 131, when a man/woman handling the door opened the door to an arbitrary angle and stopped for an arbitrary time beyond the sixth certain time, can control the excess delay time for starting the closing motion of the door with proportional to the time beyond the sixth certain time.

Further, the door closer with a delay unit having the control circuit 131, when having detected a man/woman, can adaptively delay the closing motion of the door, and thereby secure him/her safety.

Figure 17:
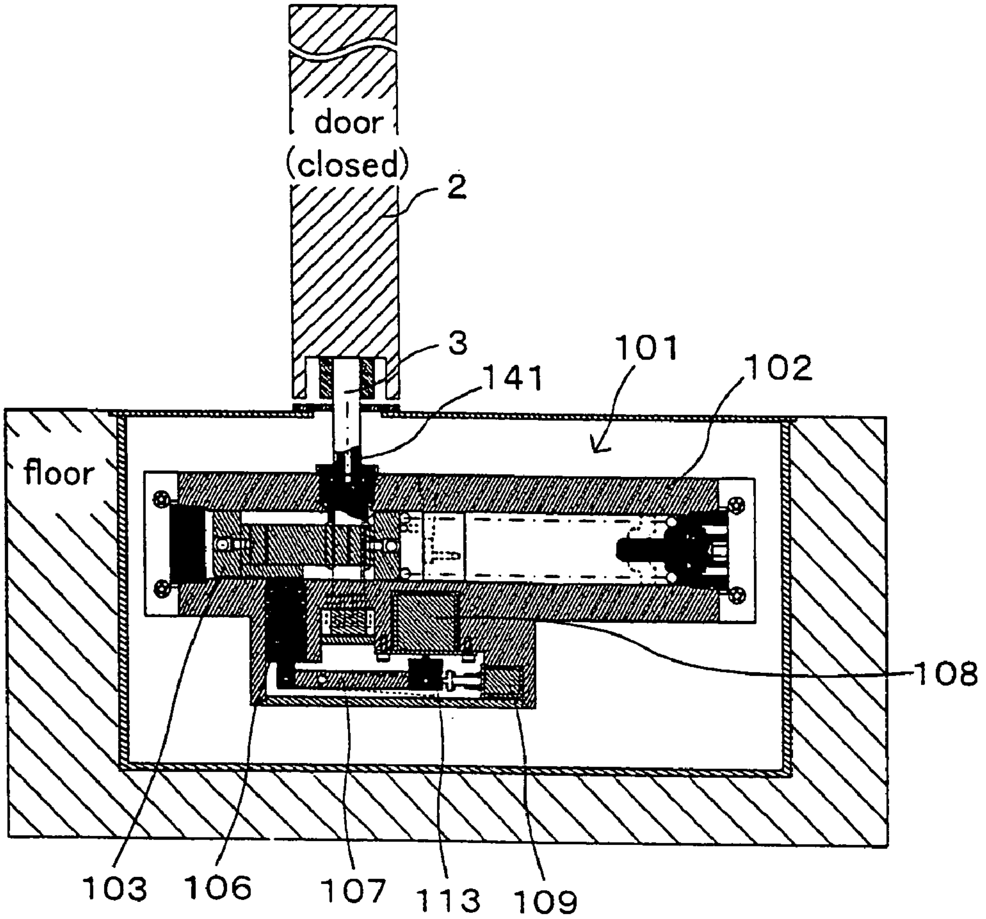
FIG. 17 is a front view of the longitudinal cross-section of the door, which is obtained by installing the door closer with a delay unit according to the forth embodiment of the present invention under the floor.

FIG. 17 is a front longitudinal sectional view illustrating the door closer with a delayed unit 101, which has the control circuit 121 or 131 and is embedded under the floor and constitutes, by combining with the door 2, a door with a door closer.

The rotation axis 141 of the door closer with the delay unit 101 is connected with the rotation axis 3 of the door 2, and thereby combining the door closer with a delay unit 101 with the door 2.

Figure 18:
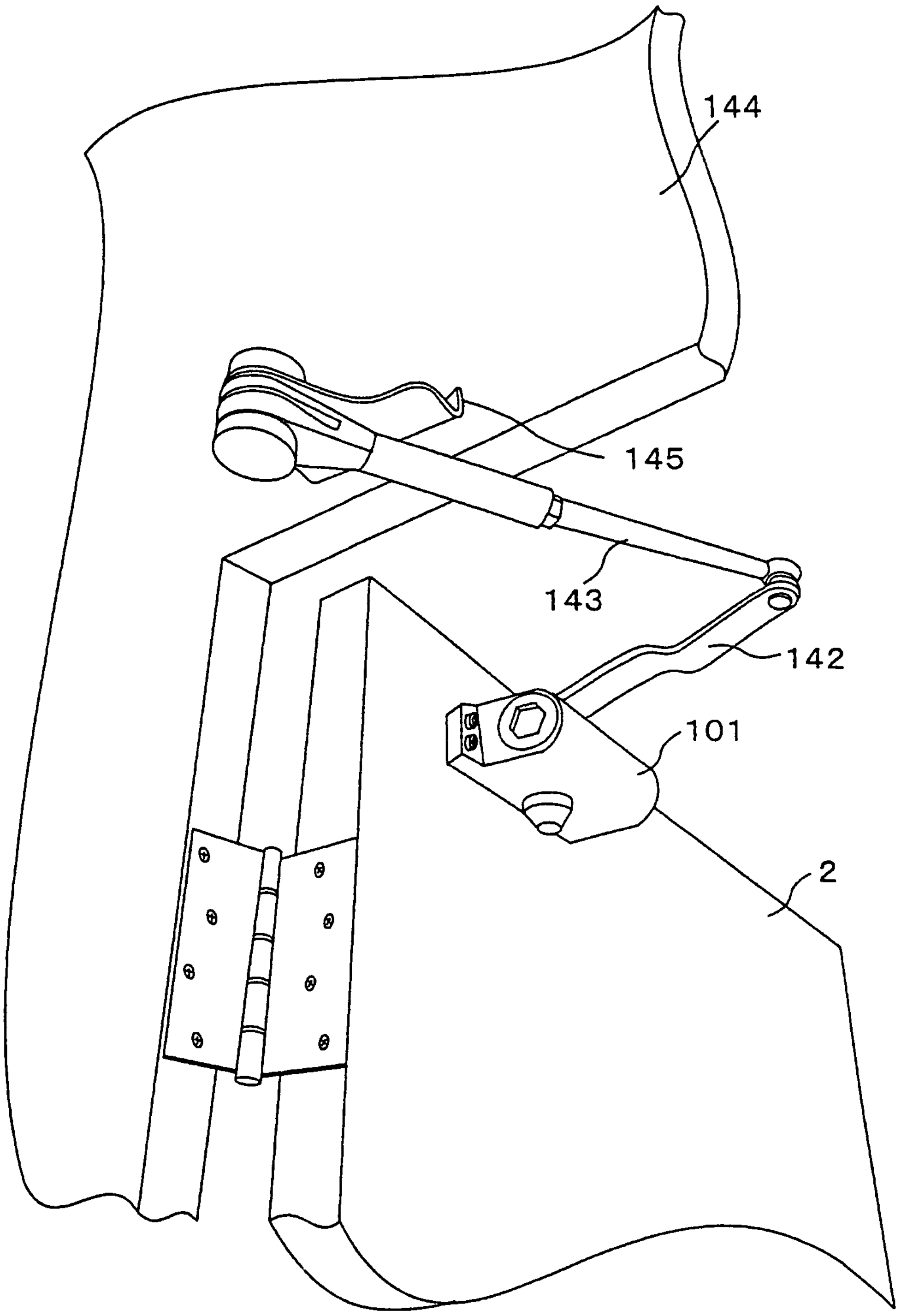
FIG. 18 is a perspective view of a door with a door closer, which is obtained by installing the door closer with a delay unit according to the forth embodiment of the present invention on the upper portion of the door.

FIG. 18 is a perspective view illustrating the door closer with a delay unit 101, which has a control circuit 121 or 131 and is aligned and fixed to the upper portion of the door 2 and constitutes, by combining with the door 2, a door with a door closer.

The rotation axis of the door closer with a delay unit 101 is tightly fixed to the proximal end portion of the lever 142, and the tip end of the lever 142 is pivotally supported at the proximal end portion of the arm 143, and the tip end portion of the arm 143 is pivotally supported at the stay for fixing to the wall 145 fixed to the wall 144.

Thus, the door closer with a delay unit 101 having the control circuit 121 or 131 can be installed under the floor or on the upper portion of the door, and thereby is highly available for many purposes.

What is claimed is:

1. A delay unit for door with a door closer comprising: a first sensor for detecting that the door with a door closer has been opened to the first certain angle; an electrical lock/unlock means for electrically locking/unlocking the rotation of the rotation axis of the door; a timer; a control means which is connected with the first sensor, electric electrical lock/unlock means, and timer and controls the electrical lock/unlock means on the basis of the signals from the first sensor and timer; wherein when the door has been opened to the first certain angle, the electrical lock/unlock means locks the rotation of the rotation axis of the door, and the control means controls the timer to start based on the detection signal from the first sensor; after the elapse of the first certain time, on the basis of the signal from the timer, the control means sends a control signal to the electrical lock/unlock means, thereby releasing the rotation lock of the rotation axis of the door by means of the electrical lock/unlock means.

2. A delay unit for door with a door closer according to claim 1, comprising a second sensor for detecting the door opened to the second certain angle, wherein the second sensor is connected with the control means; when the door has opened to the second certain angle, the electric lock/unlock means locks the rotation of the rotation axis of the door; and on the basis of the detection signal of the second sensor, the control means controls the timer to work.

3. A delay unit for door with a door closer according to claim 1, comprising a rotation angle sensor for continuously detecting the rotation angle of the door, and an arithmetic means provided with the control means, wherein when the rotation angle sensor has detected the door stopped open at an angle beyond the first certain angle less than the second certain angle, the control means controls the timer to be reset and start the measurement of the time; when the timer has finished the measurement of a total delay time defined as the excess delay time added by a delay time, the first certain time, the control means sends a control signal to the electric lock/unlock means, thereby releasing the rotation lock of the rotation axis of the door by means of the electrical lock/unlock means.

4. A delay unit for door with a door closer according to claim 3, wherein the control means, when the rotation angle sensor has detected the door stopped open at an angle beyond the first certain angle less than the second certain angle, controls, during the door is stopped, the alarm/notification means to work at a certain time interval or notify the time at a certain time interval by means of voice.

5. A delay unit for door with a door closer according to claim 1, wherein the electric lock/unlock means is tightly fixed to the rotation axis of the door, and includes a ball capable of freely engaging in a concave portion formed on the lower surface of the lock plate, a spring for pressing the ball, a lock pin capable of freely pressing the spring, and a solenoid for moving the lock pin in and out; wherein, by means of pressing the spring and the lock pin, the rotation of the lock plate is locked by pressing the ball to contact with the concave portion; by means of the energizing the solenoid, the force pressing the lock pin is released or reduced, thereby releasing the lock of the rotation of the lock plate.

6. A delay unit for door with a door closer according to claim 1, wherein the electric lock/releasing means is tightly fixed to the rotation axis of the door, and includes a lock plate for locking the rotation of the rotation axis, a lock member laid in the housing and capable of freely engaging in the concave formed on the lower surface of the lock plate, a front spring for pressing the lock member, a lock piston capable of freely sliding inside the housing and freely pressing the front spring, a rear spring for pressing the lock piston, a movable pin for locking the slide of the lock piston by means of moving in and out inside the housing, and a solenoid for moving the movable pin in and out; wherein when the movable pin has stuck out into the housing by means of the solenoid, the sliding movement of the lock piston is locked; and when the movable pin doesn't stick out into the housing by means of the solenoid, the lock of the sliding movement of the lock piston is released.

7. A delay unit for door with a door closer according to claim 1, comprising an alarm/notification means connected with the control means, and a third sensor for detecting the closure of the door; wherein the control means controls the alarm/notification means to work on the basis of at least one signal from among signals form the first sensor, second sensor, third sensor, and timer.

8. A delay unit for door with a door closer according to claim 7, wherein the control means, in order to distinguish at least one received signal among form the received signals from the first sensor, second sensor, third sensor, and time from the other, controls the alarm/notification means to generate a different sound(s) from the other.

9. A delay unit for door with a door closer according to claim 7, wherein the timer, when the control means has not received a signal from the first sensor or second sensor, starts the measurement of the time under the control of the control means; the control means, when having not received a signal from the third sensor until the finish of the measurement of the second certain time, controls the alarm/notification means to generate an alarm(s).

10. A door with a door closer comprising: the delay unit for door with a door closer defined in claim 1, connected with the rotation axis of the door, or the door closer with a delay unit including an oil cylinder and piston, the door closer comprising: a mesh portion with a plurality of teeth continuously formed on the face of the piston; a lock pin having a meshing stick portion, which is formed on the tip end and capable of freely meshing with the mesh portion and the meshing stick portion is capable of freely moving in out of inside the oil cylinder; a rod for moving the lock pin in and out of the oil cylinder; a main solenoid capable of freely pressing the rod; a sub-solenoid unit capable of holding the pressed rod at the position assumed by the press; a rotation detection sensor for continuously detecting the rotation angle of the door; a timer for measuring the time; a control means, with which the main solenoid unit, sub-solenoid unit, rotation angle detector, and timer are connected, controls the main solenoid unit, sub-solenoid unit, rotation angle detector, and timer; wherein when the rotation angle sensor has detected the door stopped its rotation at an arbitrary open angle, the control means controls the timer to start the measurement; when the door starts closing at the measured time of the rest time longer than or equal to the fifth certain time less than sixth time, the main solenoid is controlled to work, thereby the main solenoid presses the rod to mesh the meshing stick portion of the lock pin with the mesh portion of the piston; in the mean while, when the rod has pressed, the sub-solenoid unit holds the rod at the position assumed by the press and maintains the piston and door in a rotation stop state; on the other hand, the control means, when having controlled the main solenoid to work, controls the timer to be reset and start the measurement of the time; when the timer has finished the measurement of the delay time, a seventh certain time, the control means controls to press to release the holding of the rod, thereby releasing the stop state of the piston and the door.

11. A delay unit for door with a door closer comprising: a main gear being tightly fixed to the rotation axis of the door with a door closer, a outer case, to which a sub-gear meshing with the main gear is tightly fixed, a lock pin pressed, an inner case built-in inside the outer case and capable of freely rotating and tightly fixed to the building via a bracket, a lock plate provided with the inner case, a clutch laid inside the inner case, a planetary gear unit for changing the number of rotation, a spiral spring wound up by the rotation of the planetary gear unit, and a timer plate for rotating by means of the rewind of the spiral spring and releasing the lock of the lock pin after the elapse of the third certain time; wherein when the door has opened, the rotation of the rotation axis of the door is locked for a certain time, thereby delaying the start of the closing motion of the door for a certain time.

12. A delay unit for door with a door closer according to claim 11, wherein a lock hole and convex are formed on the lock plate and on the upper surface of the timer plate, respectively, so as that, when the door is opened to the first certain angle, the lower edge of the lock pin and the convex are capable of freely engaging into the lock hole; and when the lock pin has engaged into the lock hole, the convex portion of the timer plate engages into the lock hole since the elapse of the third certain time by means of the rotation of the timer plate, and then the lock pin is pressed up, thereby releasing the lock of the door.

13. A delay unit for door with a door closer according to claim 11, wherein a lock concave portion, to which a second lock pin engages in when the door has opened to the second certain angle, is formed on the upper surface of the lock plate.

14. A delay unit for door with a door closer according to claim 11, comprising a first sensor for detecting the door opened to the first certain angle, a third sensor for detecting the door closed, a timer, an alarm/notification means, and a control means, with which the first sensor, third sensor, timer, and alarm/notification means are connected.

15. A delay unit for door with a door closer according to claim 14, comprising a second sensor for detecting the door opened to the second certain angle, wherein the second sensor is connected with the control means; and the control means, when having not received a signal from the third sensor within the forth certain time measured by the timer since having had received the second sensor, controls the alarm/notification means to work.

16. A door closer with a delay unit including an oil cylinder and piston, the door closer comprising: a mesh portion with a plurality of teeth continuously formed on the face of the piston; a lock pin having a meshing stick portion, which is formed on the tip end and capable of freely meshing with the mesh portion and the meshing stick portion is capable of freely moving in out of inside the oil cylinder; a rod for moving the lock pin in and out of the oil cylinder; a main solenoid capable of freely pressing the rod; a sub-solenoid unit capable of holding the pressed rod at the position assumed by the press; a rotation detection sensor for continuously detecting the rotation angle of the door; a timer for measuring the time; a control means, with which the main solenoid unit, sub-solenoid unit, rotation angle detector, and timer are connected, controls the main solenoid unit, sub-solenoid unit, rotation angle detector, and timer; wherein when the rotation angle sensor has detected the door stopped its rotation at an arbitrary open angle, the control means controls the timer to start the measurement; when the door starts closing at the measured time of the rest time longer than or equal to the fifth certain time less than sixth time, the main solenoid is controlled to work, thereby the main solenoid presses the rod to mesh the meshing stick portion of the lock pin with the mesh portion of the piston; in the mean while, when the rod has pressed, the sub-solenoid unit holds the rod at the position assumed by the press and maintains the piston and door in a rotation stop state; on the other hand, the control means, when having controlled the main solenoid to work, controls the timer to be reset and start the measurement of the time; when the timer has finished the measurement of the delay time, a seventh certain time, the control means controls to press to release the holding of the rod, thereby releasing the stop state of the piston and the door.

17. A door closer with a delay unit according to claim 16, wherein the control means includes an arithmetic means; when the rotation angle sensor has detected the door opened at an arbitrary open angle, the control means controls the timer to start the measurement of the time; when the time taken for starting the closure of the door measured by the timer is longer than the sixth certain time, the arithmetic means is controlled to calculate the excess delay time defined as the excess time beyond the sixth certain time multiplied by a certain coefficient; in the mean while, the control means, when the door has started closing, controls the main solenoid unit to work and the timer to be reset and start the measurement of the time; and when the timer has finished the measurement of the total delay time defined as a delay time, the seventh certain time, added to the excess delay time, the control means controls the sub-solenoid unit to be energized.

18. A door closer with a delay unit according to claim 16, comprising a human sensor connected with the control means; in case that the human sensor has detected a man during the measurement of a delay time, that is, the seventh certain time, or the total delay time, the control means compares the delay time, that is, the seventh certain time, or the total delay time with a human delay time, that is, a predetermined eight certain time, and then controls the timer to measure the resulting longer time as a remaining delay time; when the timer has finished the remaining delay time, the sub-solenoid is controlled to be energized; in case that the human sensor has detected a man during the closing rotation of the door, the control means controls the main solenoid unit to be energized to immediately stop the rotation of the door and the timer to start the measurement of the human delay time, that is, the eight certain time; and when the timer has finished the measurement of the eight certain time, the sub-solenoid is controlled to be energized.

* * * * *